US011265383B2

(12) United States Patent
Reznik et al.

(10) Patent No.: US 11,265,383 B2
(45) Date of Patent: Mar. 1, 2022

(54) SYSTEMS AND METHODS FOR PERSONALIZING AND/OR TAILORING A SERVICE INTERFACE

(71) Applicant: InterDigital Patent Holdings, Inc., Wilmington, DE (US)

(72) Inventors: Alexander Reznik, Titusville, NJ (US); Yogendra C. Shah, Exton, PA (US); Eldad M. Zeira, Huntington, NY (US); Ravikumar V. Pragada, Collegeville, PA (US); Balaji Raghothaman, Chester Springs, PA (US); Kiran K. Vanganuru, San Diego, CA (US); Gregory S. Sternberg, Mt. Laurel, NJ (US); Vinod Kumar Choyi, Norristown, PA (US); Xavier De Foy, Kirkland (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 406 days.

(21) Appl. No.: 14/397,443

(22) PCT Filed: Apr. 27, 2013

(86) PCT No.: PCT/US2013/038543
§ 371 (c)(1),
(2) Date: Oct. 27, 2014

(87) PCT Pub. No.: WO2013/163634
PCT Pub. Date: Oct. 31, 2013

(65) Prior Publication Data
US 2015/0142986 A1 May 21, 2015

Related U.S. Application Data

(60) Provisional application No. 61/715,053, filed on Oct. 17, 2012, provisional application No. 61/673,485,
(Continued)

(51) Int. Cl.
H04L 29/08 (2006.01)
H04L 67/141 (2022.01)
(Continued)

(52) U.S. Cl.
CPC ............ H04L 67/141 (2013.01); H04L 63/08 (2013.01); H04L 63/20 (2013.01); H04L 67/142 (2013.01);
(Continued)

(58) Field of Classification Search
CPC ........................... H04L 67/141; H04L 67/142
See application file for complete search history.

(56) References Cited

U.S. PATENT DOCUMENTS 7,103,774 B2 * 9/2006 Wildish ................ H04L 9/3265
713/176
8,054,780 B1 * 11/2011 Manroa .................. H04L 67/26
370/328
(Continued)

FOREIGN PATENT DOCUMENTS

CN 102334370 A 1/2012
CN 102340876 A 2/2012
(Continued)

OTHER PUBLICATIONS

Sun et al., "Application of Connectivity Information for Context Interpretation and Derivation", 8th International Conference on Telecommunications-ConTEL, Zagreb, Croatia, Jun. 15-17, 2005, pp. 303-310.
(Continued)

Primary Examiner — Jerry B Dennison
(74) Attorney, Agent, or Firm — Condo Roccia Koptiw LLP

(57) ABSTRACT

Systems and methods for enabling proximity services to be delivered as part of an application service and/or for providing tailored services and/or a differential quality of service (QoS) to a flow may be disclosed. For example, a temporary service name between an application and a server such as a D2D server may be established such that a UE
(Continued)

and/or network may execute such a service at a later time without later involvement by the application and/or without exchanging credentials for the application with the network and vice versa.

18 Claims, 19 Drawing Sheets

Related U.S. Application Data filed on Jul. 19, 2012, provisional application No. 61/639,535, filed on Apr. 27, 2012.

(51) Int. Cl.
  *H04L 67/51* (2022.01)
  *H04L 69/24* (2022.01)
  *H04L 29/06* (2006.01)
  *H04W 12/08* (2021.01)
  *H04L 67/142* (2022.01)

(52) U.S. Cl.
  CPC .............. *H04L 67/16* (2013.01); *H04L 69/24* (2013.01); *H04W 12/08* (2013.01)

(56) References Cited

U.S. PATENT DOCUMENTS

| | | | | |
|---|---|---|---|---|
| 8,130,738 | B2* | 3/2012 | Chan | H04M 1/72412 370/341 |
| 9,654,366 | B2* | 5/2017 | Brown | H04N 21/2543 |
| 10,432,676 | B2* | 10/2019 | Cutler | H04L 12/1822 |
| 10,581,813 | B2* | 3/2020 | Watfa | H04L 63/0485 |
| 2002/0069262 | A1* | 6/2002 | Rigori | H04L 29/06 709/218 |
| 2004/0186996 | A1* | 9/2004 | Gibbs | H04L 63/123 713/168 |
| 2005/0076369 | A1 | 4/2005 | Cai et al. | |
| 2006/0087982 | A1* | 4/2006 | Kuure | H04L 41/5054 370/252 |
| 2006/0116117 | A1* | 6/2006 | Takase | H04L 63/0407 455/420 |
| 2006/0209768 | A1* | 9/2006 | Yan | H04L 61/2084 370/338 |
| 2006/0220838 | A1* | 10/2006 | Wakim | H04W 12/084 340/539.12 |
| 2006/0268843 | A1* | 11/2006 | Spitzer | H04Q 3/0029 370/352 |
| 2007/0037589 | A1* | 2/2007 | Watson | H04W 68/00 455/458 |
| 2007/0038723 | A1* | 2/2007 | Gourraud | H04L 65/1073 709/218 |
| 2007/0123244 | A1* | 5/2007 | Paila | H04N 21/8355 455/419 |
| 2007/0123297 | A1 | 5/2007 | Chan et al. | |
| 2007/0135048 | A1* | 6/2007 | Fiat | H04W 92/02 455/41.2 |
| 2007/0297329 | A1 | 12/2007 | Park et al. | |
| 2008/0104661 | A1* | 5/2008 | Levin | G06F 21/6218 726/1 |
| 2008/0225778 | A1* | 9/2008 | Vare | H04H 20/26 370/328 |
| 2008/0235511 | A1* | 9/2008 | O'Brien | H04L 9/0844 713/171 |
| 2008/0256232 | A1* | 10/2008 | Fleury | H04L 12/2805 709/224 |
| 2009/0006584 | A1* | 1/2009 | Gregoire | G06Q 30/02 709/220 |
| 2009/0010271 | A1 | 1/2009 | Bachmann et al. | |
| 2009/0030931 | A1* | 1/2009 | Khivesara | H04N 7/163 |
| 2009/0046676 | A1* | 2/2009 | Krishnaswamy | H04L 63/08 370/338 |
| 2009/0054053 | A1 | 2/2009 | Ormson et al. | |
| 2009/0158394 | A1* | 6/2009 | Oh | G06F 21/31 726/3 |
| 2009/0185526 | A1* | 7/2009 | Barber | H04W 28/06 370/328 |
| 2010/0040029 | A1* | 2/2010 | Doppler | H04W 28/18 370/338 |
| 2010/0154050 | A1* | 6/2010 | Mukkara | H04L 12/4641 726/15 |
| 2010/0185772 | A1* | 7/2010 | Wang | H04L 65/1016 709/227 |
| 2010/0211995 | A1* | 8/2010 | Yoshida | G06F 21/33 726/4 |
| 2010/0215019 | A1 | 8/2010 | Velev et al. | |
| 2010/0216431 | A1* | 8/2010 | Zhang | H04L 63/101 455/411 |
| 2010/0235523 | A1* | 9/2010 | Garcia | H04L 12/1822 709/228 |
| 2011/0055326 | A1* | 3/2011 | Michaelis | H04L 29/06326 709/204 |
| 2011/0098043 | A1* | 4/2011 | Yu | H04W 60/00 455/435.1 |
| 2011/0143732 | A1* | 6/2011 | Yang | H04M 3/42017 455/414.1 |
| 2011/0149874 | A1* | 6/2011 | Reif | H04W 4/24 370/329 |
| 2011/0153822 | A1* | 6/2011 | Rajan | H04L 67/14 709/225 |
| 2011/0170454 | A1* | 7/2011 | Xing | H04L 12/189 370/254 |
| 2011/0179046 | A1* | 7/2011 | Paull | G06F 8/10 707/754 |
| 2011/0196977 | A1* | 8/2011 | Lynch | H04W 4/08 709/229 |
| 2011/0282936 | A1* | 11/2011 | Chekhanovskiy | H04W 12/06 709/203 |
| 2011/0296040 | A1* | 12/2011 | Falkena | H04L 67/16 709/228 |
| 2011/0302627 | A1* | 12/2011 | Blom | H04L 63/0492 726/2 |
| 2012/0005314 | A1 | 1/2012 | Sogo | |
| 2012/0047269 | A1* | 2/2012 | Leonov | H04W 4/021 709/227 |
| 2012/0226686 | A1* | 9/2012 | Roshen | G06F 16/334 707/728 |
| 2012/0275323 | A1 | 11/2012 | Reznik et al. | |
| 2013/0024900 | A1* | 1/2013 | Suh | H04N 21/4856 725/100 |
| 2013/0117308 | A1* | 5/2013 | Korhonen | H04L 29/12113 707/770 |
| 2013/0145172 | A1* | 6/2013 | Shablygin | G06F 21/33 713/185 |
| 2013/0196694 | A1* | 8/2013 | Vanderveen | H04W 64/00 455/458 |
| 2013/0223399 | A1* | 8/2013 | Lu | H04W 76/14 370/329 |
| 2013/0287012 | A1* | 10/2013 | Pragada | H04W 76/25 370/338 |
| 2013/0288668 | A1* | 10/2013 | Pragada | H04L 67/16 455/426.1 |
| 2014/0243038 | A1* | 8/2014 | Schmidt | H04W 4/90 455/552.1 |
| 2014/0321377 | A1* | 10/2014 | Ryu | H04W 72/1247 370/329 |
| 2015/0055557 | A1* | 2/2015 | Dong | H04L 67/2842 370/328 |
| 2015/0117293 | A1* | 4/2015 | Cho | H04W 76/14 370/312 |
| 2015/0131475 | A1* | 5/2015 | Van Phan | H04W 8/26 370/254 |
| 2015/0142986 | A1* | 5/2015 | Reznik | H04L 67/16 709/228 |
| 2015/0282234 | A1* | 10/2015 | Sartori | H04W 28/0278 370/329 |

(56) References Cited

U.S. PATENT DOCUMENTS

| | | | | |
|---|---|---|---|---|
| 2015/0289125 A1* | 10/2015 | Van Phan | ............ | H04W 76/14 455/434 |
| 2016/0150390 A1* | 5/2016 | Chen | .................... | H04W 68/00 370/311 |
| 2017/0019939 A1* | 1/2017 | Shin | ...................... | H04W 76/14 |
| 2017/0188339 A1* | 6/2017 | Chai | ..................... | H04W 72/04 |
| 2017/0374611 A1* | 12/2017 | Pragada | .................. | H04L 12/14 |

FOREIGN PATENT DOCUMENTS

| | | |
|---|---|---|
| JP | 2007-535186 A | 11/2007 |
| JP | 2009-510858 A | 3/2009 |
| JP | 2009-177637 A | 8/2009 |
| JP | 2009-536005 A | 10/2009 |
| JP | 2010-532959 A | 10/2010 |
| WO | WO 2006-115215 A1 | 11/2006 |
| WO | WO 2010/024130 A1 | 3/2010 |
| WO | WO 2011/149704 A1 | 12/2011 |
| WO | WO 2012/035367 A1 | 3/2012 |

OTHER PUBLICATIONS

3rd Generation Partnership Project (3GPP), TR 22.803 V0.2.0, "Technical Specification Group SA, Feasibility Study for Proximity Services (ProSe) (Release 12)", Feb. 2012, pp. 1-17.

3rd Generation Partnership Project (3GPP), TR 23.855 V11.0.0, "Technical Specification Group Services and System Aspects, Data Identification in Access Network Discovery and Selection Function (ANDSF) (DIDA) (Release 11)", Dec. 2011, 11 pages.

3rd Generation Partnership Project (3GPP), TS 24.302 V11.2.0, "Technical Specification Group Core Network and Terminals, Access to the 3GPP Evolved Packet Core (EPC) via non-3GPP Access Networks, Stage 3 (Release 11)", Mar. 2012, 59 pages.

3rd Generation Partnership Project (3GPP), TS 33.220 V10.0.0, "Technical Specification Group Services and System Aspects, Generic Authentication Architecture (GAA), Generic Bootstrapping Architecture (GBA) (Release 10)", Oct. 2010, 75 pages.

Rescorla et al., "Datagram Transport Layer Security Version 1.2", Internet Engineering Task Force (IETF), RFC: 6347, Jan. 2012, 32 pages.

* cited by examiner

SYSTEMS AND METHODS FOR PERSONALIZING AND/OR TAILORING A SERVICE INTERFACE

CROSS-REFERENCE TO RELATED APPLICATIONS

This application is the National Stage Entry under 35 U.S.C. § of Patent Cooperation Treaty Application No. PCT/US2013/038543, field Apr. 27, 2013which claims the benefit of U.S. provisional patent application No. 61/639,535, filed Apr. 27, 2012; and U.S. provisional patent application No. 61/673,485, filed Jul. 19, 2012; and U.S. provisional patent application No. 61/715,053, filed Oct. 17, 2012; the contents of all of which are hereby incorporated by reference herein in their entireties.

BACKGROUND

Over the last half-decade, the world of cellular communications has experienced a revolution of expectations from the cellular customers or users. Historically, cellular or mobile communications were provided and evolved for a single primary purpose such as voice calls and data connectivity was seen as a nice add-on. As such, non-voice services were lumped together under the umbrella of "internet connectivity" and quality-of-service (QoS) differentiation tended to not be an issue as mobile networks did not possess significant capabilities to provide differential QoS to data services originating at a device associated with the cellular customers or users.

Today, however, both voice calls and data connectivity have become primary purposes of cellular or mobile communications as wireless and mobile services increasingly become dominate. For example, the cellular customers or users tend to run a number of applications on their mobile devices that may take advantage of service differentiation among various services including third-party services that may be connected by mobile networks. Such applications may include interactive games, e-book reader applications, heart monitoring applications, and the like that may run on a mobile device and may use service differentiation to, for example, enable content delivery and/or transmission, schedule or use resources, and the like. Moreover, such service differentiation may be associated with differentiated methods for allowing subscriber's access to services, for keeping track of the mobile network resources used and for charging for such resources and/or services. For example, the service provider, rather than the subscriber, may be charged for data usage.

Such applications running on devices may communicate with each other through the means of Internet Protocol (IP) addresses, usually by utilizing a "socket interface" application programming interface (API). While such application may be aware of application addresses, unfortunately, the applications tend to not be aware of the physical context of devices that may be running them. For example, the applications may not be aware of MAC addresses associated with the mobile devices, may not be aware of information about the proximity of other devices to a particular device, may not be aware of the underlying access control mechanism that may be used, and the like.

On the other hand, mobile networks may be aware of the devices that may be running such applications such as proximities of the devices to each other and physical characteristics of the devices, but may have a minimal awareness regarding how a customer or user may use IP connectivity that he or she may be provided. For example, mobile networks may be able to differentiate the IP data streams into individual "application flows," but may not be aware of application identities, preferences, social associations, and other suitable information that may be associated with the customer or user and the applications he or she may be running. Currently, such information (e.g. device and/or application information) may be pre-configured for use by such mobile networks and/or applications. While pre-configuring such information may work for some services such as generic and/or promiscuous services, pre-configuring such information, unfortunately, tends to fail for other services such as personalized and/or tailored services in mobile networks and/or applications where a service may not be known until the service may suddenly come into such that pre-configuration may not be possible.

SUMMARY

Systems, methods, and/or techniques for discovering devices and/or enabling differentiated services to be delivered as part of an application service may be disclosed. For example, there may be an interest in defining services such as differentiated services including proximity services in network such as a 3GPP network such that an application on one device can be made aware of the proximity of another device that may run a similar application embodying a user or a service of interest. To enable devices to discover each other and/or establish or join a session associated with the similar application on the devices, a temporary service name or temporary identifier between an application and a network may be established such that a UE and/or network may execute such a service at a later time possibly without further involvement by the application. Additionally, an intermediate identity (e.g. defined by an Open ID) may be provided and/or used (e.g. by a MNO) such that the application may translate a user name into this intermediate identity. If the service may be a proximity server, this identity may be used in D2D requests that may be provided to the network.

The Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to any limitations that solve any or all disadvantages noted in any part of this disclosure.

BRIEF DESCRIPTION OF THE DRAWINGS

A more detailed understanding of the embodiments disclosed herein may be had from the following description, given by way of example in conjunction with the accompanying drawings.

DETAILED DESCRIPTION

A detailed description of illustrative embodiments may now be described with reference to the various Figures. Although this description provides a detailed example of possible implementations, it should be noted that the details are intended to be exemplary and in no way limit the scope of the application.

Systems and/or methods (e.g. including various embodiments thereof) for enabling proximity services such as proximity discover or D2D link establishment to be delivered as part of an application service (e.g. on behalf of an application) may be disclosed. For example, in one embodiment, a temporary service name or temporary identifier between an application and a server such as a D2D server may be established such that the UE and/or network may execute such a service at a later time possibly without involvement from or of the application. Additionally, in an embodiment, an intermediate identity (e.g. defined by an Open ID) may be provided (e.g. by an MNO) and/or used such that the application may translate a user name into this intermediate identity and may use the identity in D2D requests that may be provided to the network. Additionally, such systems and methods may provide differential quality of service (QoS) to a flow as described herein. For example, the service may include or may be a D2D network service or a tailored service that may be provided and/or used. Based on the service, a QoS such as an application QoS may be differentiated as described herein.

Figure 1A:
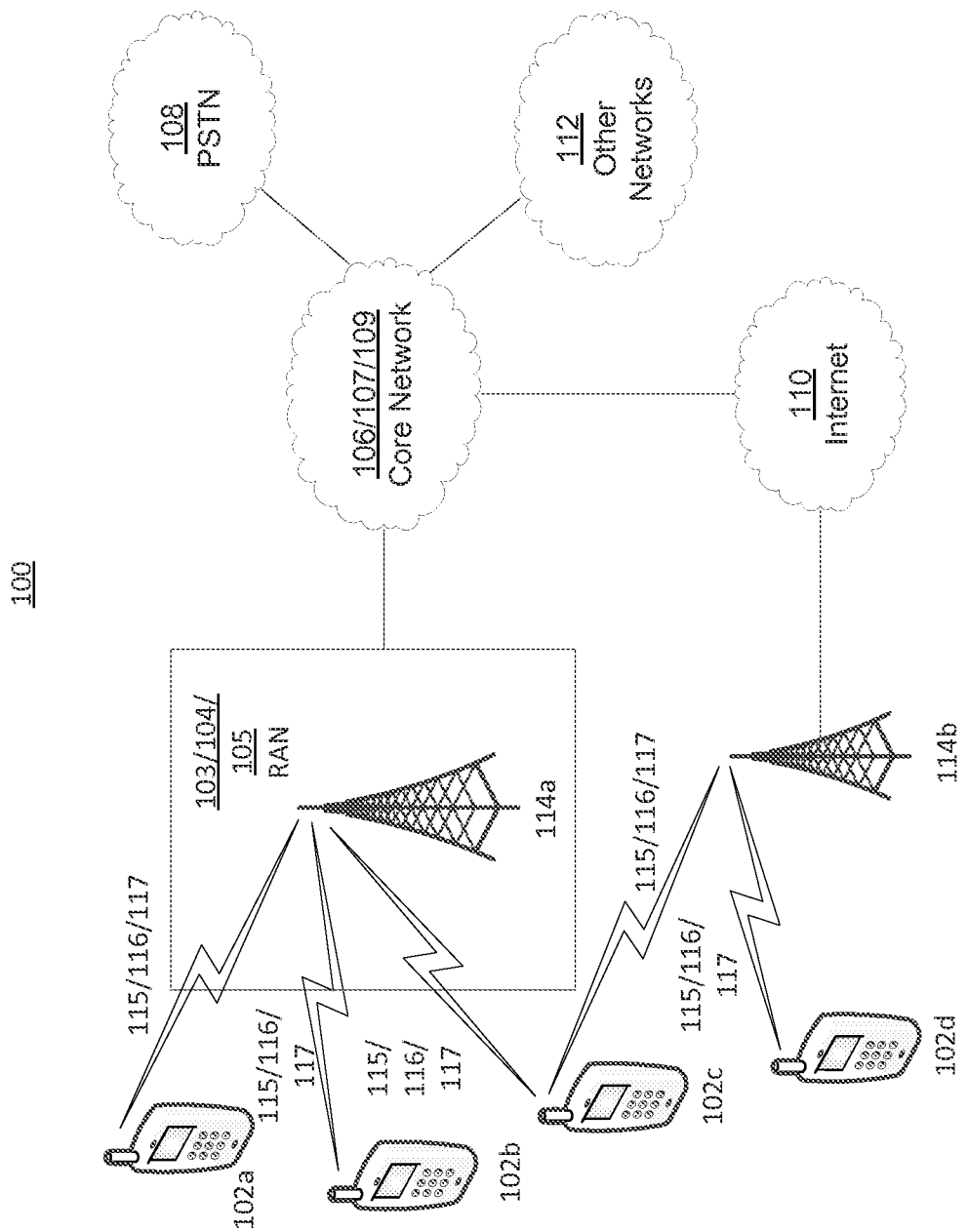
FIG. 1A depicts a diagram of an example communications system in which one or more disclosed embodiments may be implemented.

FIG. 1A depicts a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, and/or 102d may be any type of device configured to operate and/or communicate in a wireless environment. By way of example, the WTRUs 102a, 102b, 102c, and/or 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, and/or 102d to facilitate access to one or more communication networks, such as the core network 106/107/109, the Internet 110, and/or the networks 112. By way of example, the base stations 114a and/or 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a and/or 114b may communicate with one or more of the WTRUs 102a, 102b, 102c, and/or 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, and/or 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, and/or 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, and/or 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, and/or 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, and/or 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, and/or 102d in the communications system 100 may include multi-mode capabilities, i.e., the WTRUs 102a, 102b, 102c, and/or 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
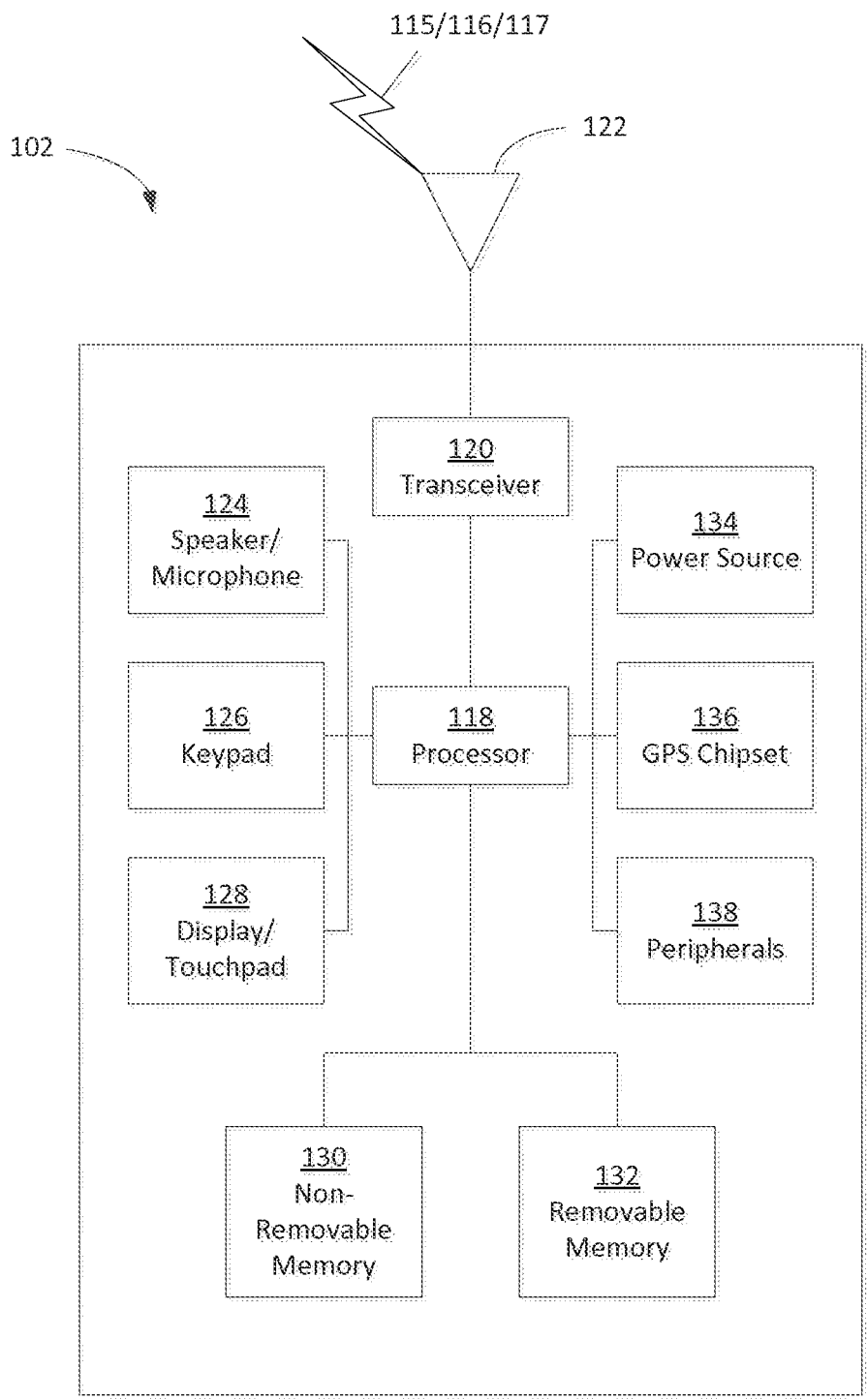
FIG. 1B depicts a system diagram of an example wireless transmit/receive unit (WTRU) that may be used within the communications system illustrated in FIG. 1A.

FIG. 1B depicts a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it may be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/

117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
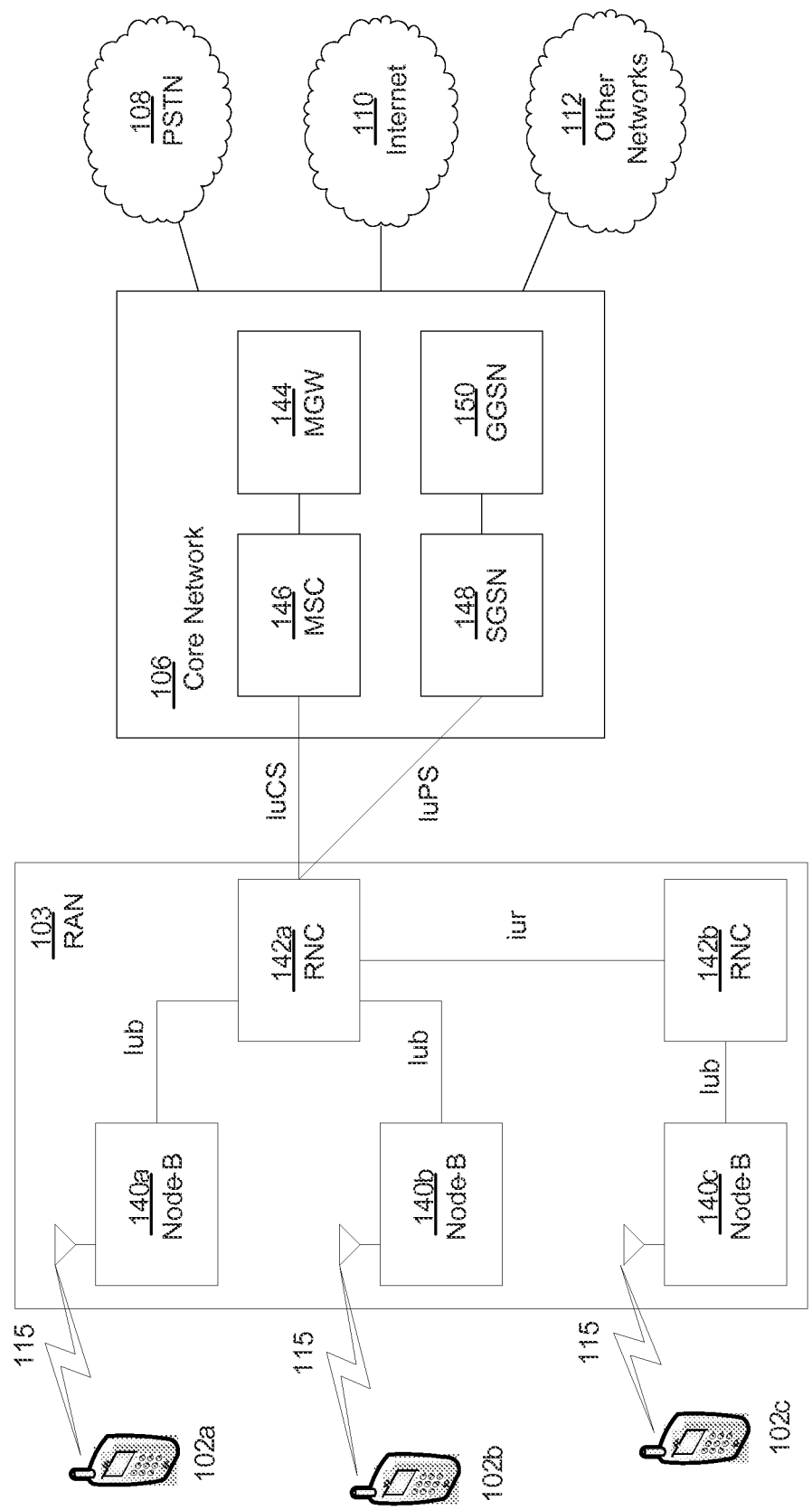
FIG. 1C depicts a system diagram of an example radio access network and an example core network that may be used within the communications system illustrated in FIG. 1A.

FIG. 1C depicts a system diagram of the RAN 103 and the core network 106 according to an embodiment. As noted above, the RAN 103 may employ a UTRA radio technology to communicate with the WTRUs 102a, 102b, and/or 102c over the air interface 115. The RAN 103 may also be in communication with the core network 106. As shown in FIG. 1C, the RAN 103 may include Node-Bs 140a, 140b, and/or 140c, which may each include one or more transceivers for communicating with the WTRUs 102a, 102b, and/or 102c over the air interface 115. The Node-Bs 140a, 140b, and/or 140c may each be associated with a particular cell (not shown) within the RAN 103. The RAN 103 may also include RNCs 142a and/or 142b. It will be appreciated that the RAN 103 may include any number of Node-Bs and RNCs while remaining consistent with an embodiment.

As shown in FIG. 1C, the Node-Bs 140a and/or 140b may be in communication with the RNC 142a. Additionally, the Node-B 140c may be in communication with the RNC 142b. The Node-Bs 140a, 140b, and/or 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, and/or 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and/or 102c with access to circuit-switched networks, such as the PSTN 108, to facilitate communications between the WTRUs 102a, 102b, and/or 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and/or 102c with access to packet-switched networks, such as the Internet 110, to facilitate communications between and the WTRUs 102a, 102b, and/or 102c and IP-enabled devices.

As noted above, the core network 106 may also be connected to the networks 112, which may include other wired or wireless networks that are owned and/or operated by other service providers.

Figure 1D:
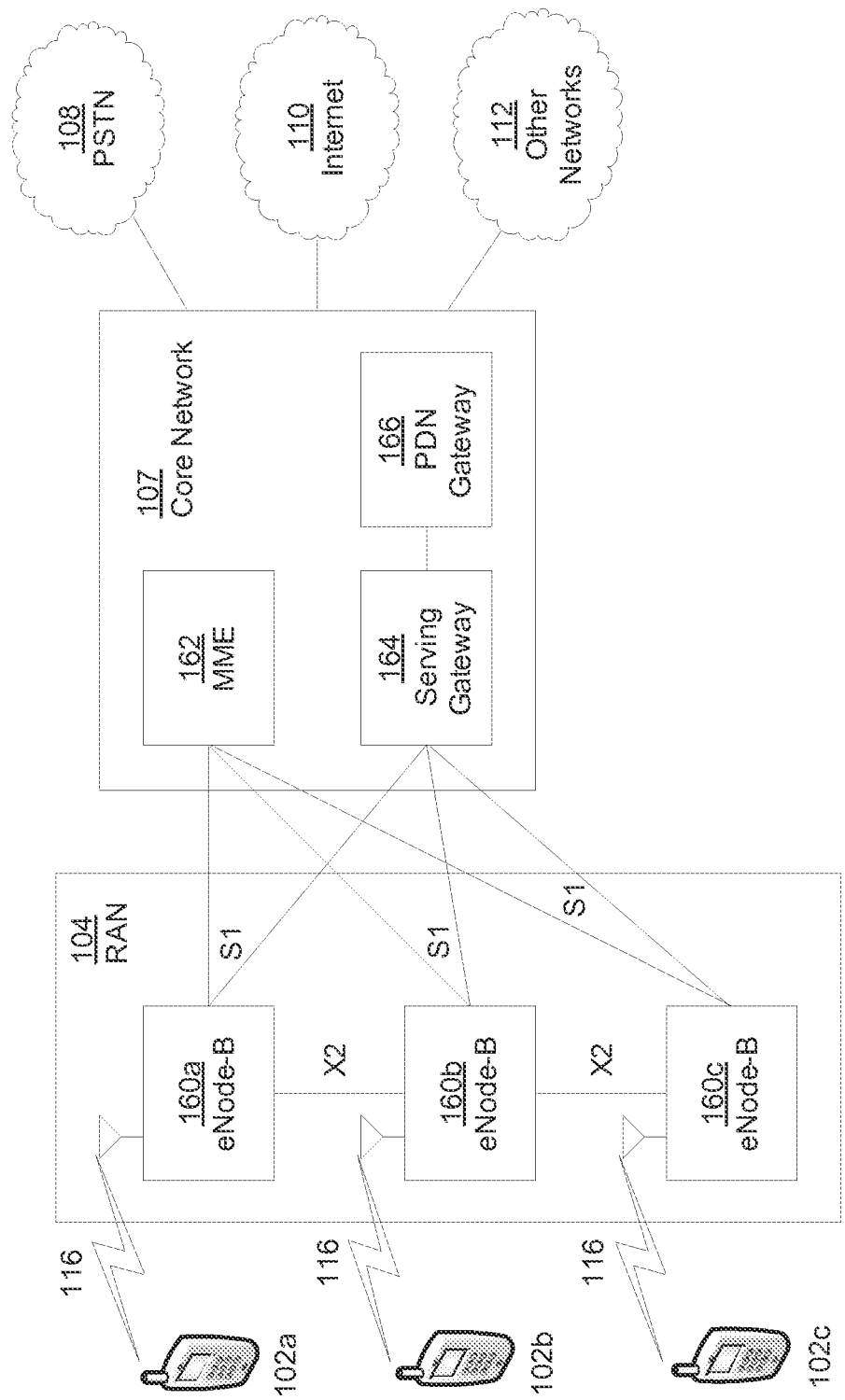
FIG. 1D depicts a system diagram of another example radio access network and an example core network that may be used within the communications system illustrated in FIG. 1A.

FIG. 1D depicts a system diagram of the RAN 104 and the core network 107 according to an embodiment. As noted above, the RAN 104 may employ an E-UTRA radio technology to communicate with the WTRUs 102a, 102b, and/or 102c over the air interface 116. The RAN 104 may also be in communication with the core network 107.

The RAN 104 may include eNode-Bs 160a, 160b, and/or 160c, though it will be appreciated that the RAN 104 may include any number of eNode-Bs while remaining consistent with an embodiment. The eNode-Bs 160a, 160b, and/or 160c may each include one or more transceivers for communicating with the WTRUs 102a, 102b, and/or 102c over the air interface 116. In one embodiment, the eNode-Bs 160a, 160b, and/or 160c may implement MIMO technology. Thus, the eNode-B 160a, for example, may use multiple antennas to transmit wireless signals to, and receive wireless signals from, the WTRU 102a.

Each of the eNode-Bs 160a, 160b, and/or 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, and/or 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and/or 160c in the RAN 104 via an S1 interface and may serve as a control node. For example, the MME 162 may be responsible for authenticating users of the WTRUs 102a, 102b, and/or 102c, bearer activation/deactivation, selecting a particular serving gateway during an initial attach of the WTRUs 102a, 102b, and/or 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and/or 160c in the RAN 104 via the S1 interface. The serving gateway 164 may generally route and forward user data packets to/from the WTRUs 102a, 102b, and/or 102c. The serving gateway 164 may also perform other functions, such as anchoring user planes during inter-eNode B handovers, triggering paging when downlink data is available for the WTRUs 102a, 102b, and/or 102c, managing and storing contexts of the WTRUs 102a, 102b, and/or 102c, and the like.

The serving gateway 164 may also be connected to the PDN gateway 166, which may provide the WTRUs 102a, 102b, and/or 102c with access to packet-switched networks, such as the Internet 110, to facilitate communications between the WTRUs 102a, 102b, and/or 102c and IP-enabled devices.

The core network 107 may facilitate communications with other networks. For example, the core network 107 may provide the WTRUs 102a, 102b, and/or 102c with access to circuit-switched networks, such as the PSTN 108, to facilitate communications between the WTRUs 102a, 102b, and/or 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, and/or 102c with access to the networks 112, which may include other wired or wireless networks that are owned and/or operated by other service providers.

Figure 1E:
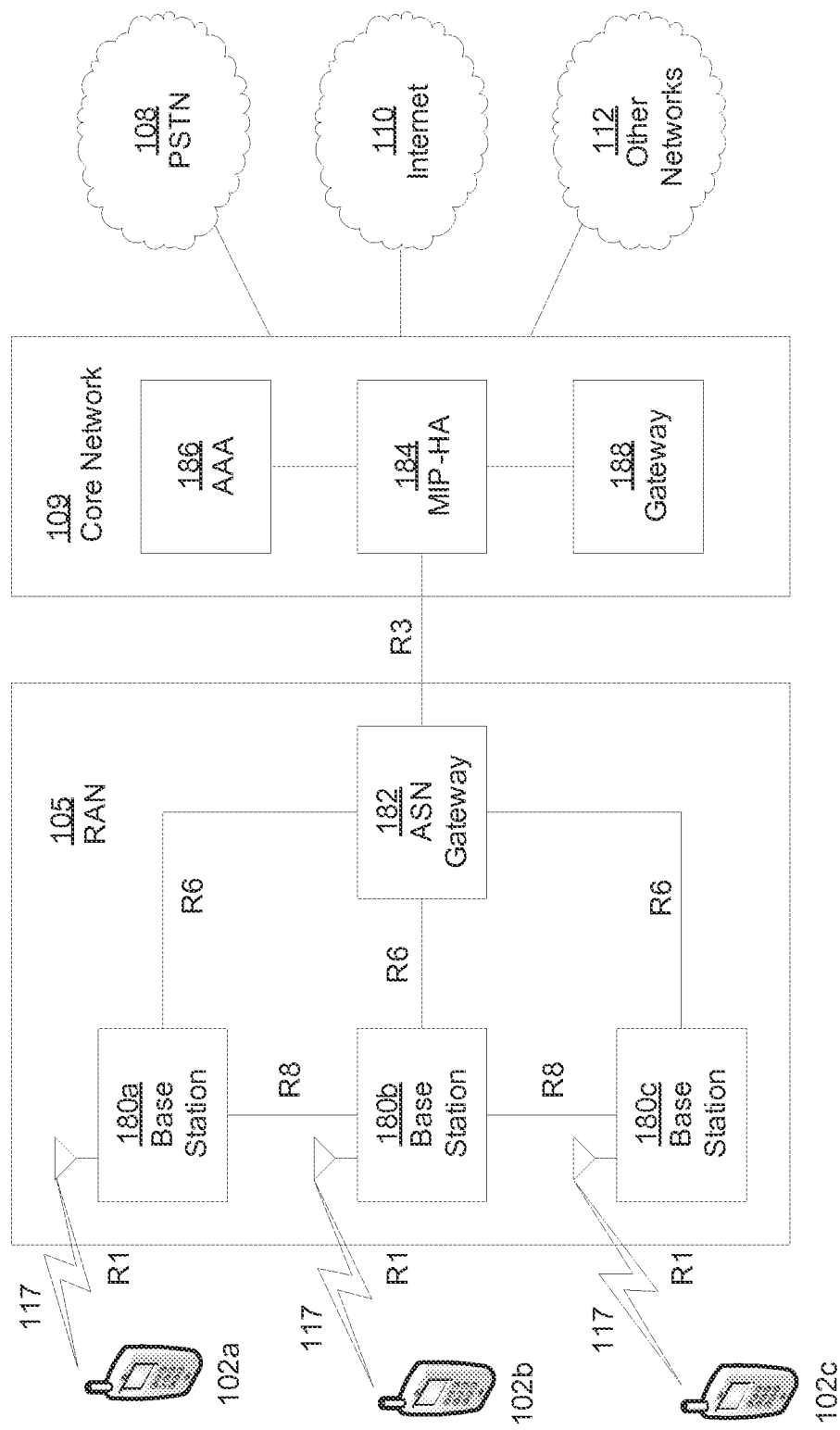
FIG. 1E depicts a system diagram of another example radio access network and an example core network that may be used within the communications system illustrated in FIG. 1A.

FIG. 1E depicts a system diagram of the RAN 105 and the core network 109 according to an embodiment. The RAN 105 may be an access service network (ASN) that employs IEEE 802.16 radio technology to communicate with the WTRUs 102a, 102b, and/or 102c over the air interface 117. As will be further discussed below, the communication links between the different functional entities of the WTRUs 102a, 102b, and/or 102c, the RAN 105, and the core network 109 may be defined as reference points.

As shown in FIG. 1E, the RAN 105 may include base stations 180a, 180b, and/or 180c, and an ASN gateway 182, though it will be appreciated that the RAN 105 may include any number of base stations and ASN gateways while remaining consistent with an embodiment. The base stations 180a, 180b, and/or 180c may each be associated with a particular cell (not shown) in the RAN 105 and may each include one or more transceivers for communicating with the WTRUs 102a, 102b, and/or 102c over the air interface 117. In one embodiment, the base stations 180a, 180b, and/or 180c may implement MIMO technology. Thus, the base station 180a, for example, may use multiple antennas to transmit wireless signals to, and receive wireless signals from, the WTRU 102a. The base stations 180a, 180b, and/or 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, and/or 102c and the RAN 105 may be defined as an R1 reference point that implements the IEEE 802.16 specification. In addition, each of the WTRUs 102a, 102b, and/or 102c may establish a logical interface (not shown) with the core network 109. The logical interface between the WTRUs 102a, 102b, and/or 102c and the core network 109 may be defined as an R2 reference point, which may be used for authentication, authorization, IP host configuration management, and/or mobility management.

The communication link between each of the base stations 180a, 180b, and/or 180c may be defined as an R8 reference point that includes protocols for facilitating WTRU handovers and the transfer of data between base stations. The communication link between the base stations 180a, 180b, and/or 180c and the ASN gateway 182 may be defined as an R6 reference point. The R6 reference point may include protocols for facilitating mobility management based on mobility events associated with each of the WTRUs 102a, 102b, and/or 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and/or 102c to roam between different ASNs and/or different core networks. The MIP-HA 184 may provide the WTRUs 102a, 102b, and/or 102c with access to packet-switched networks, such as the Internet 110, to facilitate communications between the WTRUs 102a, 102b, and/or 102c and IP-enabled devices. The AAA server 186 may be responsible for user authentication and for supporting user services. The gateway 188 may facilitate interworking with other networks. For example, the gateway 188 may provide the WTRUs 102a, 102b, and/or 102c with access to circuit-switched networks, such as the PSTN 108, to facilitate communications between the WTRUs 102a, 102b, and/or 102c and traditional land-line communications devices. In addition, the gateway 188 may provide the WTRUs 102a, 102b, and/or 102c with access to the networks 112, which may include other wired or wireless networks that are owned and/or operated by other service providers.

Although not shown in FIG. 1E, it should, may, and/or will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, and/or 102c between the RAN 105 and the other ASNs. The communication link between the core network 109 and the other core networks may be defined as an R5 reference, which may include protocols for facilitating interworking between home core networks and visited core networks.

As described above, over the last half-decade, the world of cellular communications has experienced a revolution of expectations from cellular customers or users. For example, historically, cellular or mobile communications typically evolved for a single purpose which included voice calls and data connectivity was seen as a nice add-on. Additionally, non-voice services tended to be lumped together under the umbrella of "internet connectivity," quality-of-service (QoS) differentiation tended to not be an issue, and/or mobile networks tended to not possess significant capabilities to provide differential QoS to data services originating at a WTRU or user equipment (UE).

Today, however, wireless and mobile services tend to dominate. For example, users run a number of applications that may take advantage of various services and/or service differentiation. For example, such applications may include one or more of the following: interactive games between a small group of players that may use or benefit from optimized point-to-point connectivity between such players (e.g. that may be especially true when such players may be in physical proximity to each other to optimize performance and resource usage); a user downloading content such as a book from an e-reader service, which may need to be done quickly (for example, before boarding a departing flight), and, as such, "expedited delivery" for such a purchase may be requested resulting in an optimized content delivery to the device associated with the user; a heart monitor associated with a user that may detect an anomaly such that a high-priority report may be forwarded to the health monitoring center in physical proximity to the current location associated with the user. In an embodiment, such services may be information that an application with a specified user may receive and/or send to another application with other potential users including how such information may be sent and/or received. Furthermore, such services may include a transfer of information including proximity or location information for discovery (e.g. for the ability and/or inability of the service to discover itself).

Additionally, mobile networks have evolved or may be currently evolving with features that may enable effective service differentiation. Examples of such evolutions to service differentiation may include one or more of the following: the ability to use WiFi for QoS optimization as opposed to just bulk offload; the ability to setup direct device-to-device (D2D) connections between the UEs that are within range of each other; the ability to customize the service (e.g. the destination end-point) based on contextual information such as location, time-of-day, and the like. In an example embodiment, the application may differentiate such services such that the network may account for and/or charge for use of network resources by the application.

Such developments may point to a future where the QoS that a mobile network may deliver to an application may depend (e.g. to a significant or particular degree) on the application itself, the user's subscription to the mobile service and/or to the application service, the presence or absence of the user's "friends" both "online" and in physical vicinity of the user, and/or a variety of other contextual factors. To enable such an application specific, context dependent experience, a new type of interaction may be used between the application service provider that may support the particular service the application may deliver and the mobile service provider that may deliver the actual connectivity. The nature of such an interaction may be described herein.

In an embodiment, such services and/or interactions that may be delivered and/or used by users may be classified according to several characteristics. The first of such characteristics may be related to who may use the service. In such an embodiment, services may be grouped into three broad categories that may include one or more of the following: promiscuous or a type of service that may be available to anyone such as tethering for the purpose of internet access (or the closely related notion of coverage extension); closed-group or typically a well-defined, usually, small group of users that may share the same service such as interactive gaming and/or online collaboration and may be either pre-defined (e.g. a pre-existing CompName+ Circle) or may defined by the users at the time of service setup by specifying which other users it wishes to share the service with; and user specific or services specific to a particular user such as health monitoring, "expedited" download of purchased online content, and the like that may be types of services that may be treated as a special case of closed-group services where the closed group may be restricted to a single user. As described herein, "closed-group" services may include "user-specific" services.

A second characteristic of such services and/or interactions may be the level of customization associated therewith. In such an embodiment, services may be differentiated as generic or tailored (e.g. personalized). Generic may include services where each session may have, broadly, the same or similar characteristics as one or more other sessions. For example, an e-book browse and purchase session (e.g. Amazon's Kindle) may have roughly the same destination (e.g. a Kindle server farm) and QoS usage (e.g. requirements) for a user that may start such a session and may retain the session for a very long time.

Tailored services may include services where every session may be different. For example, each session of an interactive peer-to-peer game may involve different players at different locations and may use different types of optimizations to establish connectivity. Such a type of service may be a tailored service (e.g. may be referred to as tailored). Another example may be when a user may request an expedited download of a purchased book. Because the download has to be optimized to that user's context (e.g. fee paid, location, available, networks, content size, and the like), the e-book download may be a tailored service (e.g. may be referred to as tailored).

Two characteristics of a tailored service may be that such services tend usually be closed-group and/or short-lived. For example, a generic "e-book" service and an "e-book download designed to allow Jane Doe to obtain her copy of War and Peace within the next 2 minutes at her current location in Terminal 1 of JFK International airport" may include various differences. The former may remain essentially the same for many users at multiple locations over a long time period. Accordingly, it may be possible for the application provider and network operator to "pre-negotiate" how this service may be handled off-line and pre-program the policies and procedures into the network equipment and user-devices. The latter service may be nonsensical outside the small bounds of time when the service may be used, for a specific user that may use it, and in a specific location. An attempt to pre-setup such services may fail. Accordingly, some spontaneous and real-time online negotiation between the application service and the network operator may be used. Such a type of negotiation may be described herein.

In an example, a tailored service setup for negotiating between an application service provider and a mobile network operator may be defined and/or applied in closed-group, tailored services as described herein and/or in promiscuous or generic services as well.

Additionally, as described herein, mobile network services associated with application services may be created and managed in real-time. When formulating embodiments disclosed herein, various interactions, assumptions, or characteristics may be provided and/or used regarding the interaction between the mobile network and a putative application server. For example, in one embodiment, a reasonable interaction between an application server (AppSe) and the mobile network may be provided. Such an interaction may use an established business relationship that may exist or that may be assumed to exist. Additionally, in an embodiment, while the UEs, or mobile devices, may access application servers with which they may have a service agreement, the mobile network (MN) may not access such applications servers, for example, due to the lack of a relationship (e.g. such as a business relationship and/or a lack of credentials of the MN and/or application server being known to the other) between the mobile operator and the operator of the application servers (or application entities servers). Such a lack of a relationship may lead to the embodiments and functionality (e.g. disclosed herein) that may be used to provide the same functionality (e.g. may enable access between the MN and the application servers and may or may not be standardized).

As described above, applications (e.g. such as applications that may communicate with each other through IP addresses, for example, using a "socket interface" (e.g. an application programming interface (API)) may not be designed to be aware of the physical context of the devices that may be running them. For example, an application may not be aware of MAC addresses associated with the devices, may not be aware of information about the proximity of other devices to a particular device, may not be aware of the underlying access control mechanism that may be used or provided, and the like. Mobile networks, on the other hand, may be aware of the devices in the network and the physical characteristics thereof (e.g. physical proximity of the devices may be a type of information that a mobile network may naturally possess). The mobile networks may also be responsible for allocating IP addresses to devices and ensuring seamless connectivity and also stability of IP addresses, for example, as devices move. However, mobile networks may have minimal awareness of how users use the IP connectivity the users may be provided. As such, while the mobile networks may be able to differentiate the IP data streams into individual "application flows," the mobile networks may not be aware of the application identities, preferences, social associations, and the like associated with the user or users.

Additionally, while the mobile network may identify a particular application flow and associate it with some application services, the mobile network may not know what, if any, differential QoS to provide to such a flow. As described above, such information may be pre-configured. However, pre-configuring such information may not work (e.g. may fail) for tailored services where pre-configuration may not be possible as nothing may be known about the service until the service suddenly comes into being. As such, a method, technique, or process may be provided (e.g. as described herein) in such an embodiment.

Embodiments may be disclosed herein to enable proximity services such as a proximity discovery or D2D link establishment to be delivered as part of an application service (e.g. on behalf of an application).

For example, in an embodiment (e.g. a first method or procedure), an architecture and associated procedures may be provided to enable an establishment of a temporary service name between an application and a network or server such as a D2D Server. Such an embodiment may enable a UE and network to later execute such a service possibly without direct involvement of the application.

In another embodiment (e.g. a second method or procedure), the application may remain involved during the execution of the D2D service. In such an embodiment, a temporary service name may not be used. Rather, an MNO provided intermediate identity (e.g. Bootstrap Id (B-TID or an Open ID) may be provided and/or used. In such an embodiment, the application may translate the user name into this intermediate identity and may then use such identities in D2D requests sent to the network. Additionally, according to an embodiment, the application may not need to stay involved during the discovery if the intermediate identity may have been provided to the application on the UE.

Additionally, both embodiments may be complementary. For example, the application may be independent (e.g. in the first method or procedure) of the D2D operation, enabling a UE-driven model, while a deeper integration of the proximity service within the application may be enabled (e.g. in the second method or procedure). Furthermore, both embodiments may have various advantages. For example, the first method or procedure may enable a user to engage in ProSe without being logged on to an application, which may reduce battery consumption and network traffic in signaling and keep alive messages. The second method or procedure may enable real time control of the application including how (e.g. much) it may be charged for ProSe services and specific events may be charged for, for example, attempting discovery, successful discovery, and the like.

In the first method or procedure, a service such as a D2D network service may be used for QoS differentiation. Such a service may be used to differentiate application QoS. Additionally, in an embodiment, an example application may include an interactive game (e.g. GameName) that may be played between groups of users (or people). In such an application or interactive game, a group may perform and/or implement a goal or objective such as building and/or maintaining (e.g. as a goal) a medieval city-state and may protect it against attacks that may be simulated by a game server. Additionally, a city may be associated with a closed group of participants and the groups may not interact. In an embodiment, when a single player of a group may be online and playing, the session associated with that city may be active. As such, the game may use high-QoS connections for high data rate and low-latency between players and certain features may be enabled if the players may establish direct over-the-air (D2D) links.

In an embodiment (e.g. when performing the first method or procedure), a mobile network (MN) to application server (AppSE) interface may be provided and/or used (e.g. may exist). In such an embodiment, a real-time service negotiation may be provided as follows. The application server may know or generally be aware of the following: a list of users allowed to use the service and the identities that may be used by each application user to refer to or contact other application users; the QoS requests or wishes of the service including context-specific information (e.g. location limitations), and the like; the applicable business terms for provisioning of such a service by the mobile network provider (e.g. whom may be charged); and the like.

Additionally, the application server may notify the mobile network of a request or wish (e.g. a need) to establish a new service. In doing so, the application server may negotiate the parameters of the service (e.g. QoS differentiation wishes (or requests) and means, location limitations, and the like). Additionally, the application server may also let the network know which users may be allowed to use the service. For example, the application server may notify the network that a new application or game session such as a GameName session may have started and that this particular session may run over D2D links (e.g. it may be a session for D2D features of the game (e.g. D2D-only features)).

In an embodiment (e.g. unless the service may be promiscuous), user identification (e.g. of the specific user) may be or may have to be used (e.g. when a MN to AppSe interface may exist). For example, the application server may have to notify the network which users may participate in the initiated sessions. Consequently, the user IDs used by the application may be associated with the user IDs used by the network. For example, the application server and network provider may generate and/or associated the ID used by the network provider with the persistent application identity (e.g. an identity of the user on the application server as described herein). Additionally, third-party identity providers that may be trusted by both the application and mobile network may be used. OpenID protocols may be an example of a protocol that may support such a federated identity management service. In an embodiment, identities that may be used by the network provider may also be usable across more than one network provider. For example, one user in a group may be provided application services by one MNO and another user in the same group may be provided application services by another MNO and the identities may be harmonized across the MNOs and may be traced back to a single unique identity, for example, at the application server. Additionally, in embodiments, such identities may be useful even for open (e.g. promiscuous) discovery. For example, such identities may be used for commercial advertisements that may be discovered by UEs or users, but may still use or need an identifier.

Once the application service and the network provider may have negotiated the establishment of a new service, a temporary service name may be created for the service associated with a given network provider. The application provider may provide this service name to each of the users that may utilize this particular network operator. In an embodiment, at this point, the role of the application provider may become limited. For example, the application provider may be invoked or used when the session may need to be changed (e.g. users come online or leave such that a session QoS may be re-negotiated or terminated). Otherwise, the newly created service may be treated by the network as a generic "named" service with a pre-negotiated QoS (e.g. a pre-negotiated QoS request, wish, or need) and the network may take over the connectivity management for such a service.

As described herein, in an embodiment, the mapping between the application identifier (ID) and a network ID may be one to one. Alternatively, in an embodiment, a one-to-many mapping between a single network identity and multiple application identities may be provided and/or used. This may save network signaling that may be used to maintain and update identities. Discovery occurring with this type of mapping may not be able to uniquely identify the context of which of the applications discovery may have occurred. As such, an additional action may be provided after discovery in the procedure and/or method. For example, applications may contact their respective application servers to determine which of such servers or applications should take further action. Additionally, in an embodiment, UEs may establish a secure communication channel (e.g. when starting and/or joining a session for a service) and may then exchange the application identities (e.g. for which there may be no ambiguity) between each other.

The network operator may use the service name in policies and/or procedures that the UEs and other network equipment may follow. For example, in an embodiment, enabling D2D services may involve using a particular set of IP addresses by the UEs for flows that use D2D. In such an embodiment, the network may instruct UEs that flows being originated by, for example, the application (e.g. a GameName application) associated with the specific session may use D2D-enabling IP addresses and source IPs.

In another example embodiment (e.g. when performing the first method or procedure), a MN to application server (AppSe) interface may not be provided and/or used (e.g. may not exist). In such an embodiment, service negotiation (e.g. in real-time) may be provided as follows. The application server may know or generally be aware of the following, for example, parameters or information: a list of users allowed to use the service and their identities; the QoS requests or wishes of the service including context-specific information (e.g. location limitations), and the like; the applicable business terms for provisioning of such a service by the mobile network provider including billing; and the like.

According to an embodiment, mobile devices such as UEs, WTRUs, and the like that may be registered with their mobile network operator (MNO) may securely access the AppSe and may establish with it (e.g. the AppSe) the parameters described above. After establishing these parameters, the parameters may be subsequently stored on the devices.

Additionally, a UE that may be interested in a service related to the application may contact the network or MNO and request a new service. One or more parameters such as service type and parameters may be provided and/or used (e.g. to request the new service). In example embodiments, service parameters may include one or more of the following: a nature of data exchanged for the service (e.g. "best effort"), a link type (e.g. ProSe), a designator for the individual or groups of users with which service may bewanted, a temporary name for an existing service which the UE may wish or want to join, and the like.

As described herein, in an embodiment, user identification such as specific user identification may be provided and/or used (e.g. when a MN to AppSe interface may not exist). For example, the application server may have to store on the UE which users may participate in the initiated sessions. As such, the user IDs that may be used by the application may be associated with the user IDs that may be used by the network. For example the application server and network provider or MNO may generate and/or associate the ID that may be used by the network provider with the persistent application identity. Additionally, in an embodiment, third party identity providers that may be trusted by both the application and mobile network may be used. According to example embodiments, along with or in addition to the ID that may be used by the network, there may be a second ID that may be transmitted by UEs to be discovered. The mapping between the two IDs, for example, may be one to one and may be known to the network. In an embodiment, the temporary identity (e.g. the temporary service name) may be provided by the application itself, i.e the application server may take on the functionality of the identity provider in addition to its role as an application provider. OpenID protocols may still be followed in such an embodiment between the operator network and the application server.

Furthermore, as described above, OpenID protocols may be an example of a protocol that may support such a federated identity management service (e.g. when an MN to AppSe interface may not exist). In embodiments, the identities that may be used by the network provider may be such that they are usable across more than one network provider. For example, one user in a group may be provided application services by one MNO and another user in the same group may be provided application services by another MNO and the identities may be harmonized across the MNOs and may trace back to a single unique identity at the application server.

In an example embodiment, the MNO may not know the nature of the application, but may know a unique identifier for it, as access to the application and associated service parameters may be requested (e.g. directly) by the UE. A unique application identifier across different application servers may be created according to one or more of the following: with application names registered in a service directory; using long random identifiers (e.g. that may leave a low probability of confusion where the implications of such confusion may not be severe if the application ID may be used for discovery and the UE ID may not be deduced from it); with an application and/or service identity that may be received or obtained in real time from a third party (e.g. an open ID perhaps at the same time as when it may verify a UE subscriber identity).

Additionally, the identifiers may be created using one or more of the following: In an embodiment, application names may be registered in a standardized manner, similar to URL addresses, e.g. app-sub-type.app-type@company.type-of-app. For example, a chess application may register the following: fast-chess.chess-online@chess-is-us.games, which may be a unique reference or identifier of the application. Additionally, random application identifiers may be generated by the application and appended to user IDs. Such a random identifier may reduce the probability of user ID collisions between applications and may result in longer user IDs. In another embodiment, to enable an operator to securely charge the application provider, an application may obtain a cryptographically secure identifier from any or a combination of several sources. These cryptographically secure identifiers may not be able to be faked or reproduced and may be used as proof of payment. For example, these identifiers may include a third part business entity (e.g. a credit card company and the ID which may signify payment) and/or the mobile operator such that the ID may be provided through interaction with the mobile network and/or outside of such interaction. Once the UE and the network provider may have negotiated the establishment of a new service (e.g. even when an interface may not exist between the MN and AppSe), a temporary service name may be created for the service as described herein. Service identities may be provided and/or used as described herein. The services identities that may be received or obtained from a third party may be inherently unique and, thus, may be used across network providers. Additionally, other service identities may be provided and/or used and may be unique within a network provider. The UE may be aware of the temporary service name and may provide it (and/or other temporary services names of other UEs) to the AppSe.

The application provider may provide this service name to one or more users such that those users may join a session or interaction or service. As described above, at this point, the application provider's role may be limited. For example, it may be involved or used when the session may be changed (e.g. users come online or leave, a session QoS may be re-negotiated, a session may be terminated, and the like). Otherwise, the newly created service may be treated by the network as a generic "named" service with a pre-negotiated QoS and the network may take over the connectivity management for this service.

The network operator and the MN thereof may use the service name in policies and procedures that the UEs and other network equipment may follow. For example, in an embodiment, enabling D2D services may cause a particular set of IP addresses to be used by the UEs for flows that may use D2D. In such an embodiment, the network may instruct the UEs that flows being originated by the application such as the GameName application associated with the specific session may use D2D-enabling IP addresses and source IPs. The network may also collate and coordinate the information from multiple UEs that may be part of the same service and may manage discrepancies in user lists, policies, and the like.

Figure 2:
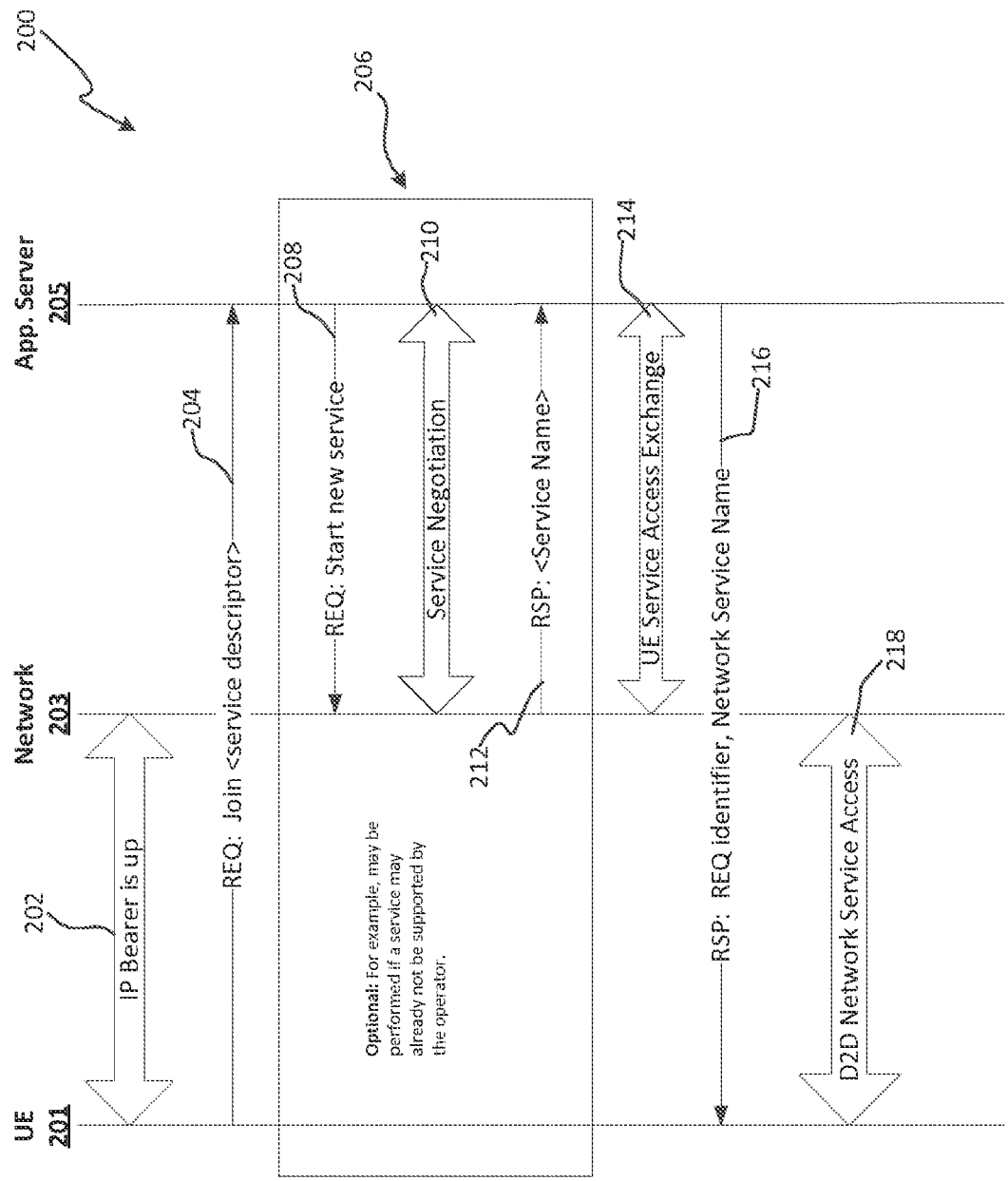
FIG. 2 depicts an example embodiment of a third-party service access method, process, or procedure.

FIG. 2 illustrates an example embodiment of a third-party service access method, procedure, or process that may be used to discover devices that may, for example, want to participate in a session provided an application using a network. As shown in FIG. 2, in an embodiment, a pre-existence of internet protocol (IP) connectivity at the UE may be managed by the network. For example, at 202, an IP bearer may be set up between a UE such as a UE 201 or the WTRU 102a-d and a network such as a network 203 or the network described in FIGS. 1A-1E. The exchanges between the UE and the network or network provider thereof may also use an application-layer protocol over such an IP connection. Additionally, a protocol may be used for communication between the network operator and service provider. Such protocols may include one or more existing protocols such as HTTP, HTML, XML-SOAP, and/or any other suitable protocol. As described herein, the context of the exchange may be defined including the interactions between the network and application server.

As shown in FIG. 2, the UE may subsequently contact an application server such as an application server 205 and the service provider thereof. For example, in an embodiment, at 204, the UE may send a request to start or join a session of an interactive game to the application server. The request may provide or include an indication to the application server that the UE may be available and wants to participate in a session or service provided by the application server. The request may also provide suitable information about the UE and/or the service or session it may want to joint. For example, the information available to the service provider in the request may include the network operator that may be used by the UE. In an embodiment, after receiving the request, the service provider or application provider of the application server may verify whether it may have a relationship with the network and network operator (e.g. the MNO) such that the service may be supported and the request may be fulfilled when a relationship may exist. To perform such a verification, the service or application provider may check its list of operators that it may have a relationship with against the information in the request received at 204 and may identify this as one such operator if the information matches an operator in the list. In another embodiment, services may be supported even when no relationship may exist and enhanced QoS supported through options like D2D may be used to provide or enable a collaboration between the network operator and service provider.

As described herein, at 206, a service initiation and negotiation procedure may be performed (e.g. when a MN to an AppSe interface may exist). For example, in an embodiment, if the service provider may identify a UE as the first UE from a network provider to join a session, interaction, or service such as a game session, the service provider may send a request to the network to initiate or start a new service for users of the network at 208. For example, in response to the UE's request to join a session that may be received by the application server at 204, if the session may not be started, the UE may request the provider to initiate a new service at 208.

A service negotiation between the network and service providers may then follow at 210. In the service negotiation, parameters for the session and/or service may be exchanged between the application server and the network. Additionally, the application server may indicate or signal to the network how the UE from which the request may have been received (e.g. at 204) may be added to a session or service. In example embodiments, the service negotiation may include establishing or generating an agreement on one or more of the following service parameters: a service name (e.g. a temporary service name); a user and/or UE identity; a billing and/or charging reference that may be used for proper billing and/or charging for the data communication associated with the service; service security parameters (e.g. to what extent data may have to be secured, authenticated, and the like); service QoS requirements including specific network connectivity requirements, for example: D2D usage: <required; preferred; no preferences; avoid when possible; restricted>; WLAN usage: <required; preferred; no preferences; avoid when possible; restricted>, and the like; localization parameters such as global, local to a pre-defined area, a network subset, local to the specific access area where the service may be initiated, and the like; a time restriction such as service start time, end time, and the like (e.g. a time period in which the service may be active and/or may expire after non-use); and or any other suitable parameter.

According to an example embodiment, if a session may already be started for a service provided by the application server or the provider thereof (e.g. a UE may have already initiated a session), the service negotiation at 210 may not need to be performed again for subsequent UEs that may wish to join the session. Rather, the subsequent UEs may send a request to join the session at 204 as described above to the application server and the application server may determine whether the subsequent UEs are authorized to join the session rather than performing the service negotiation.

After performing the service negotiation and/or during the service negotiation a service name may be generated and sent from the network to the application server at 212. In an embodiment, the naming of the service may be unique. Additionally, in an embodiment, the service name may be independent of a user name or credentials associated with the application provided by the application server and/or independent of a network identifier associated with the UE and/or network as described herein. For example, the network and/or application server may initiate the session or service using the service name without exchanging actual credentials used by the user to log onto the application server or the UE to access the network.

For example, the name selected may be unique with respect to the large multitude of other services that may be (or recently may have been) active with the network operator and application provider. Additionally, in an embodiment, identifying social network elements, an application originating the service, a user group, and the like in the name may also be provided or used. For example, suppose that a new GameName game session may be associated with a group of users (e.g. a CompName+ circle where members of the circle may be the players). The resulting session may be named CompName.GameName.CompNameGroupXYZ.Application_abc where CompName may be the name of the social network service providing the service, GameName may be a unique name for the proximity service; CompNameGroupXYZ may be the name of the CompName+ circle which represents the closed user access group; and Application_abc may be the name of the application session. In an embodiment, "Application_abc" may represent a randomly generated string. Such a randomly generated string may be used to ensure uniqueness of session names as these are created and destroyed. The randomly generated string may alsobe sufficiently long such that the probability of collision may be sufficiently low. Alternately, a unique identifier between a service (e.g. application) provider and the network provider (e.g. "ServiceNetID") may be negotiated between the network and application server as part of a long-term relationship. Additionally, tailored, temporary sessions may be identified by appending a randomly generated string to an identifier for such a session (e.g. to create an identifier which may be sufficiently long to avoid collisions) and/or a sequence number may be used that may be allowed to increment sufficiently to avoid repetitions within a defined time period. Additionally, other alternative ensuring meaningful and unique service names and/or identifiers may also be used. One or more suitable variants of the foregoing may also be used (e.g. trading off the compactness of a description for specificity in a format) as long as a unique name may be created to identify a specific service session as described herein (e.g. below).

In embodiments, the temporary service name and registry thereof may be constructed to ensure each name may be unique across applications. For example, as described above, the name may be constructed using a URL convention or format, e.g. by specifying an address format such as A.B@C.D. In such an embodiment, "D" may be a top domain name that signifies the type of application, such as ".game", ".date", ".meet" or ".machine". These may be agreed by the industry to have a fixed meaning or may be arbitrary. "C" may be a domain name used by a company, i.e. a company may decide to use an arbitrary name (that may not already be used) and register it. Once registered the name may not be used by another application. Additionally, "A" and "B," which may be option, may be specific to the application, may not have to be registered, and may be used to define "sub" types. Additionally, a short URL form such as (http://xxx.xx/zhtjk) which may be the short URL for the application (CompName.GameName.CompNameCirclexyz.Application_abc). Such short URLs may be registered within a domain and may be unique within a given domain, locally, within the scope of operations, and/or globally. In an embodiment, such uniqueness may be enabled by checking the stored identities of applications that have already been assigned. As a variant, uniqueness may be enabled cryptographically, where, application identities may be derived partially using:

RandomAppId=KDF(Fixed Seed, "CompName.GameName.CompNameCirclexyz.Application_abc")

AppId=CompName.GameName.RandomAppId

After generating the service name, UE service access may be exchanged between the network and application server at 214 and the service name and other identifiers may be sent from the application server to the UE at 216 such that the UE can use the service name to join session (e.g. the UE may be given an identifier for a particular session with particular users). As described herein, in D2D, the UE may further advertise to other UEs on network that it may be in a particular session with a particular service name or identifier and that it may be available to other UEs. Additionally, if subsequent UEs that may want to join the session for the service may be authorized to do so, those subsequent UEs may be provided with the service name at 216 (e.g. the service name may be sent to those UEs at 216) such that those subsequent UEs can join the session for the service.

For example, once the service name may be defined (or if it may already exist), the service provider and network provider may negotiate the access of the UE to the service using any suitable protocol at 214. Single-sign-on solutions such as OpenID or a Generic Bootstrap Architecture (GBA) (e.g. in 3GPP) may further be used, as may be other approaches such that access control and/or authorization may be provided. Once or when such a process may be complete, the service provider may respond to the UE with the network service name that may correspond to the desired service session at 216.

Then the UE and the mobile network may use the service name and associated parameters to manage communications for the particular service (e.g. at 218). In an embodiment (e.g. to use the service name and associated parameters to manage communications for a particular service), enhanced Access Network Discovery and Selection Function (ANDSF) and concepts thereof may be used. ANDSF may be a policy framework where the network may instruct the UE which access networks to use for communications. For example, ANDSF may provide Inter System Routing. Policies (ISRP). ISRP and the concepts thereof that may already be present in ANDSF may enable or allow such a specification to be IP flow specific in the sense that policies may be associated with specific IP 5-tuples. Such ANDSF and/or ISRP and the concepts thereof may enable or allow policies to be specified by application name, destination domain name, and the like. Thus, for example, when a new tailored service may be defined, an ANDSF policy update may be provided to the UEs that may use such a service. In an embodiment, the update may call for or may need the UE to identify the associated application, for example, by name or destination domain and may apply the appropriate policies to IP flows. In such an embodiment, the application may be the application used by the user for the application service to be provisioned. Additionally, the policies may reflect the QoS specifications associated with the service as negotiated by the network. The provision of policies to the UE may occur by either the pull method where a UE may request a policy update for a particular service name or a push method where the network may push an update to a set of UEs which may use it. In an embodiment, UEs that may not use a particular service may simply ignore the policy associated with the particular service.

Additionally, as described herein, a service negotiation (e.g. 210) where a MN to an AppSe interface may not exist may be provided and/or used. For example, in an embodiment where a formal business arrangement may not exist or be provided between the network and the application provider, a UE may perform a service negotiation with the application and may agree upon an initial set of service parameters including the service name, user identity, QoS, time limitations, and the like. The UE may then provide the network with these negotiated parameters. From the service name, the network may recognize or determine whether the UE may be initiating a new service or whether it may be joining an existing service. The network may then reconcile the service features (e.g. requirements) that may be provided by the UE with its policies, and also with the existing set of service parameters (e.g. in case of an existing service). According to an example embodiment, the network may be the final arbiter of the access parameters for the service and may provide the UE with the same. The UE may then inform the application server of modifications in the service parameters. The ability of the application to negotiate service parameters with the network, for example, through the UE, may depend on the support of the network to UE derived requests for service parameters.

Figure 3:
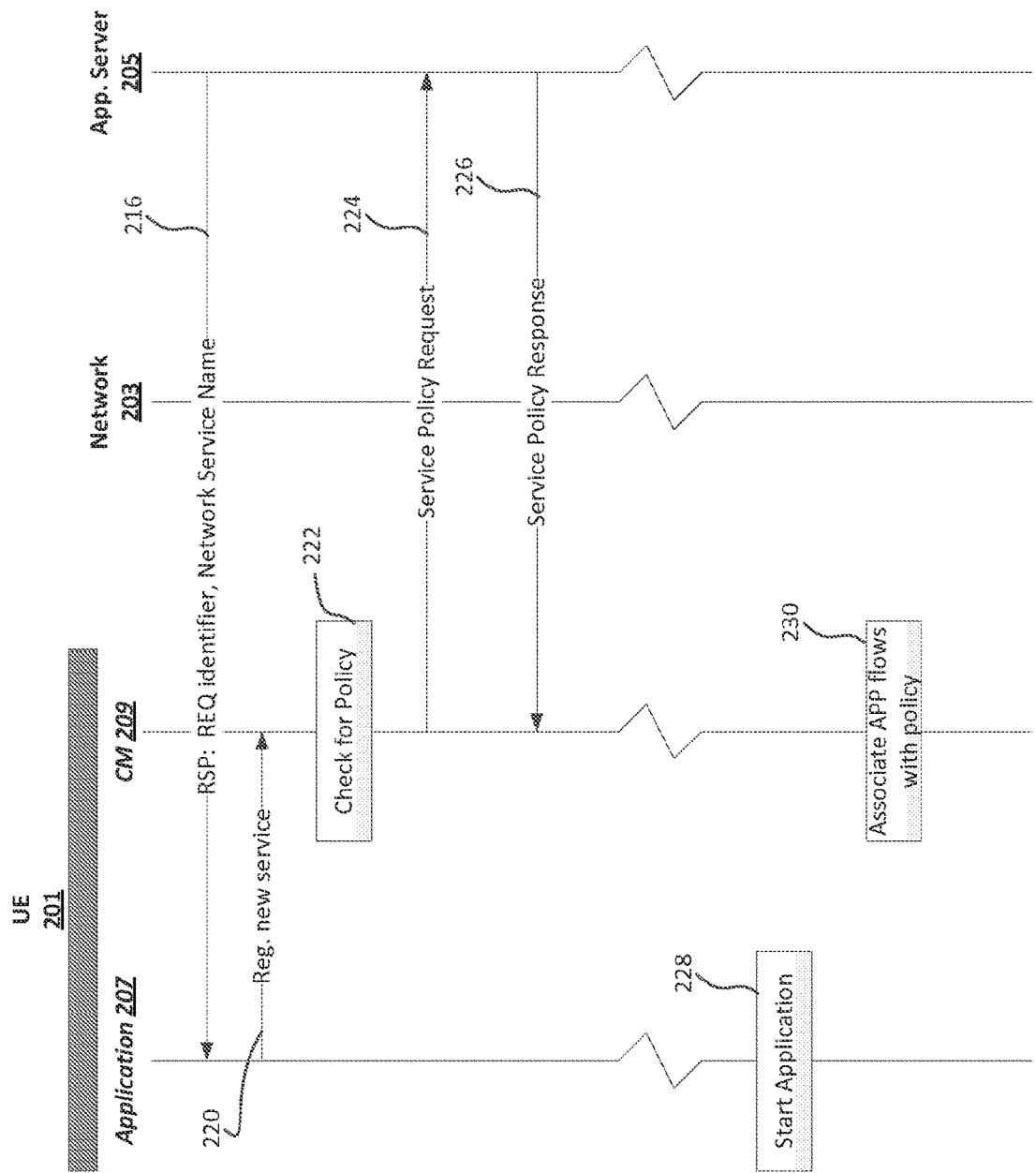
FIG. 3 depicts an example embodiment of a policy pull method, process, or procedure.

Policy management may also be provided and/or used as described herein. An example of a policy pull process or method that may be used herein may be shown in FIG. 3. In an embodiment, FIG. 3 may start where FIG. 2 leaves off or ends (e.g. with the response from the Application Server to the UE which includes the service name at 216 and/or when network service access may be managed at 218). As shown in FIG. 3, the UE such as UE 201 may include the application (e.g. running as a process) such as application 207 as well as a connection manager (CM) such as CM 209.

The CM may be a commonly used entity designed to automate and manage the communication needs or wishes of the UE. For example, the CM may be used to select the air interface (e.g. cellular or WiFi) for communication. It may also be used to automate the sign-on process, collect air-interface quality measurements and other tasks. As such, the CM may be a natural location for policy clients such as the ANDSF client that may be located there.

Thus, when the application on the UE may receive the name of the tailored service from the application server (e.g. at 216), the application may inform (e.g. register) 226 the name with the CM at 220. The CM may check (e.g. determine) whether it may currently have a policy such as restrictions, allowances, parameters, and the like (e.g. restrictions for particular flows, and the like described herein) associated with such a service name at 222. If the CM may not have a policy (e.g. as would be the case with a new tailored service), it may contact the application server (or even network) to request a policy for the given service at 224. As discussed above, ANDSF may be used as the protocol for transmitting and encoding the policy, where the CM may be the enforcement point for ANDSF policies. The application server may respond (e.g. may send) the appropriate policy (e.g. based on its earlier interaction with the application server) for the CM to store at 226. The application may then be started at 228. When (e.g. at a later time) the application may open IP flows associated with such a service (e.g. typically via a socket interface), the CM may detect such a flow and may apply appropriate policies at 230. Flow detection may be performed via a number of different methods or techniques that may detect a flow and/or a sub-flow and the appropriate policies may include any suitable criteria or policies that may be based on the flow being detected or other parameters such as bandwidth, characteristics of the flow, detection levels, and the like.

Figure 4:
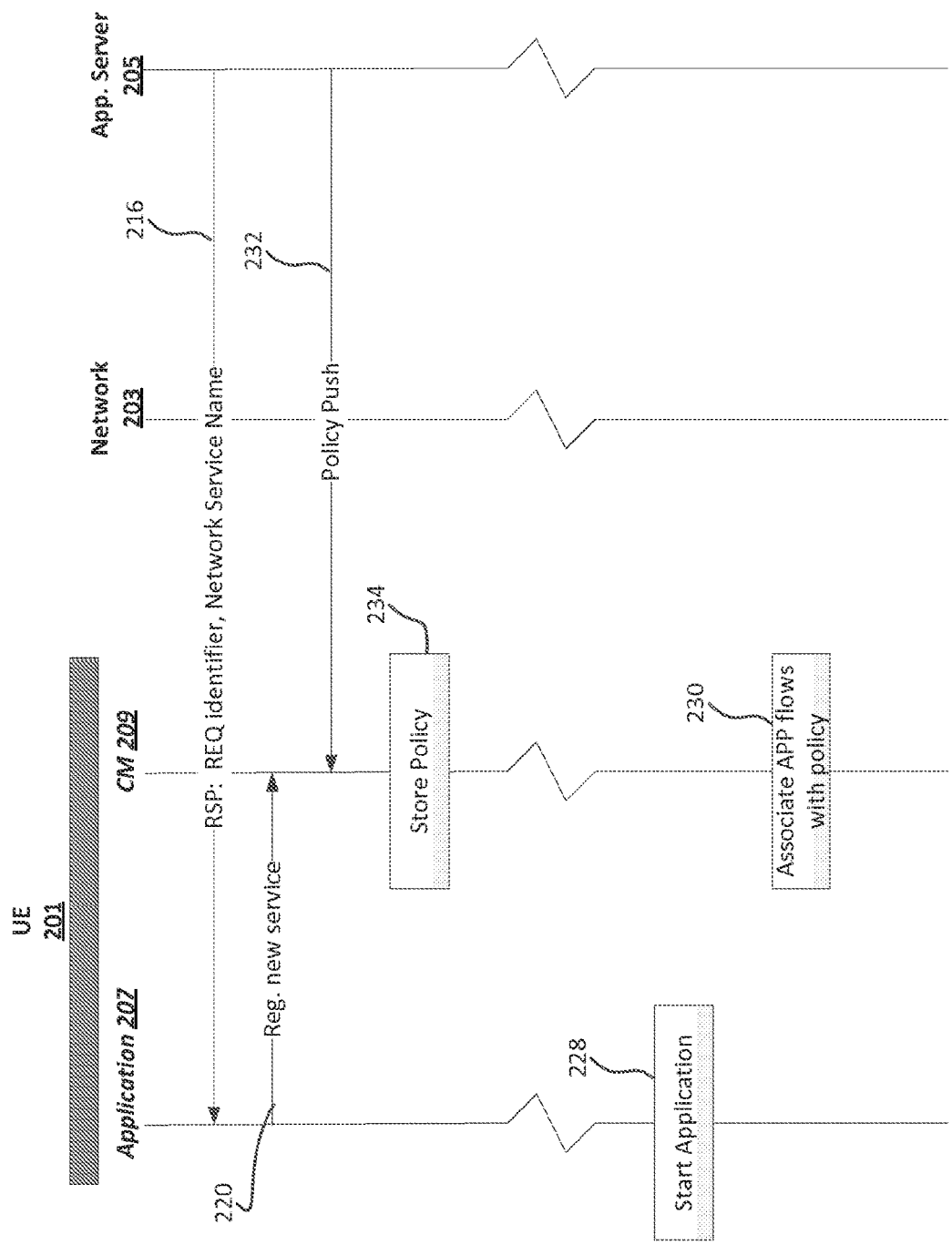
FIG. 4 depicts an example embodiment of a policy push method, process, or procedure.

FIG. 4 illustrates an example embodiment of a method or procedure where a policy may be pushed to the UE from the server, for example, either via a broadcast (e.g. to a large number of UEs) or via a direct push to the UE. The method or procedure may be similar to the pull method or procedure (e.g. shown in FIG. 3) except that the CM may not request a policy update from the application server. Rather, the CM may receive a push of the policy from the application server at 232. Upon receiving a push of the policy, it (e.g. the CM) may store the policy update at 234. In doing so, the CM may apply a filter, for example, storing policies for services it may be aware of Thus, in such an embodiment, the application may still pre-register a service with the CM to ensure that a service-specific policy may be present (e.g. when needed).

Security considerations may also be provided and/or used as described herein. For example, the communications between the application (and/or AppSe) and network (and vice versa) may be (e.g. at the very minimum) integrity protected and/or (e.g. optionally) encrypted. In addition, the communication that may happen between the user and/or subscriber and the application that may be pertain to signaling and control may be protected via TLS or some form of application-level protection. In an embodiment (e.g. optionally), the communications may be bound to a channel such as TLS to mitigate Man-in-the-middle, impersonation and masquerading attacks.

The user and/or subscriber may be configured to (e.g. optionally) provide authorization either explicitly or implicitly. Implicit authorization may be provided via proof of possession of session or signing keys, while explicit authorization may be provided via user input of certain password/PIN/passphrase, via characteristics of the user such as biometrics or mental/psychological characteristics, and the like.

In embodiments, privacy considerations may be provided and/or used. For example, another aspect of the communications that may be provided and/or considered may be privacy such as UE, user identity and service privacy. According to an embodiment, the user may want or wish to maintain privacy of its identity, location, physical proximity, service availability, and needs or requests from other users. If the service that may be advertised at the access layer may be easily associated or linked to the service provider service, a UE may inadvertently advertise information at the access layer that it may wish to keep private. For example, a user may wish to keep secret its presence from others. At the same time, the UE identity may also be kept private from other UEs. For example, a UE may not want or wish to be discovered by other UEs without first being consulted when a "friend" may be in its proximity. As such, a UE may want or wish to keep its presence information private until such a time as it may want or wish to communicate to a friend circle such as a CompName+ circle of its proximity. Thus, the identity obfuscating information may be communicated to the application server where the application server may associate an identity with a specific UE and may maintain the privacy settings of the UE.

One way to address privacy may be to use a random identifier for the service or UE identity that may ensure uniqueness and privacy. For example, a unique random identifier may be generated in a variety of ways including random selection from a list that may be provided, cryptographic hashing of the application service name or UE identity, and/or in any other suitable manner. To further obfuscate an identity, identities may be frequently exchanged or updated to prevent identification through logging and long term observation of communications. In any of such embodiments, the name may include a unique service name or UE identity that may be temporary and/or may be defined dynamically in real-time.

As one means of maintaining privacy during service advertisements, a temporary service name may be used and cycled so that the actual service name is not discoverable except by other UEs that are also subscribed to the same service. For example, the service name (e.g. the CompName.GameName.CompNameGroupXYZ.Application_abc may be used as a secret name, or a secret "master service key" string may be appended to it or transmitted separately for this service. Each UE may receive such a string and may derive a temporary service advertisement using a secure derivation method, such as a secure hash. Such a temporary service advertisement may be broadcasted by the UE (and other UE subscribed to the same service). Another UE which may also subscribed to this service may be able to deduce the actual service name by matching the advertised string with its own advertised string. However, a UE not subscribed to the service may not be able to derive the actual service name.

To further improve security, the temporary broadcast service name may be changed from time to time to a new service name, for example by hashing the time or a nonce broadcast by the application server together with the strong secret to "refresh" the temporary broadcast service name. While UEs subscribed to the service may be able to associated the multiple different temporary services names with the same underlying service by matching the broadcast strings with those they may be able to derive locally, UEs not subscribed to the service and not in possession of the "master service key" may not be able to do so—i.e. may not be able to associate the two temporary service names with the same service, thus providing privacy.

A system and/or method (e.g. a mechanism) for deriving a temporary identity (e.g. the service name or temporary service name and/or a temporary UE identity) may be provided and/or used and may be based on a Key Derivation Function, for example, of the form KDF (Key, String). The Key may be a shared secret between the UE and the network, while the string may represent the context in which the Key Derivation Function (KDF) may be used. The string may include (e.g. at a minimum may be made of) an identity (e.g. a permanent identity) of the UE (e.g. IMSI) and a random variable that may have been used during negotiation or authentication, and the like. Additionally, the string may include (e.g. may be made of) parameters that may describe the context of use (or usage) such as "ProSe."

In an example embodiment, the KDF may take the form: UETemp=HMAC-SHA256 (KeyN, IMSI|Nonce$_{MNO}$|UTF-8encoding("ProSe") and the temporary value or identity derived may be the first 32 bits of the output of the KDF. KeyN may be a shared secret between the UE and the MNO/Operator or the ProSe Server. IMSI, may be the identity of the UE. Other derived or permanent identities may also be used such as the T-IMSI, B-TID instead of the IMSI. Nonce$_{MNO}$ may be a random value that may be generated by the MNO or the UE (Nonce$_{UE}$) or both may be used having varying lengths but having good random properties. A string such as the form "ProSe" may be optionally used to derive the UETemp. The UETemp may be derived by using just the two parameters such as Nonce and KeyN without using other parameters. In an embodiment, either Nonce$_{MNO}$ or Nonce$_{UE}$ may be used as parameters for the UE temporary identity creation process. Additionally, the size of the temporary identity may vary (e.g. and may be left to the implementation) and may be of adequate length to ensure uniqueness of the temporary identity. The temporary identity derived for the UE may then take the form: UETempID=(Temp)base64@prose.MNO.com.

Similarly, a temporary application identity for the subscriber/user may be derived as follows: UserTemp=KDF (KA, Nonce, UTF-8encoding (UserIdentity|"CompName.GameName.CompName-GroupXYZ.Application_abc") and the temporary user/subscriber identity derived therefrom may take the form: USERTempID=(USERTemp)base64@applicationabc. CompNameGroupXYZ.GameName.CompName.com, or the form: http/applicationabc.CompNameGroupXYZ.GameName. CompName.com/(USERTemp)base64. K$_A$ may be the shared secret between the UE and the application. The Nonce may be a Nonce$_{App}$ or Nonce$_{User}$ or a combination of both Nonce$_{User}$ and Nonce$_{App}$. Nonce$_{App}$ may be random value generated by the application. UserIdentity may be the user's identity associated with that application. The application name may also be included as parameters for deriving the UserTemp. A Nonce$_{User}$, generated by the User, may also be optionally included as part of the UserTemp generation process. The UserIdentity and the application name (CompName.GameName.CompNameCirclexyz.Application_abc) may be optional parameters. In an embodiment, either of a Nonce$_{User}$ or Nonce$_{App}$ may be included as part of the temporary Identity generation process. The NonceUser and NonceApp may both be included as part of the temporary identity creation process. In another embodiment, the User-TempID and the UETempID may be self generated by both the UE and the Network or Application using time components (such as date, time and the like) periodically. The periodicity may be agreed upon during the registration process. This avoids the need for both the UE and the Network or Application to communicate Nonces between the entities thus saving resources and improving latencies. Alternatively, Nonces may be used during the initial generation of the temporary identity and thereafter the temporary identities are created at each entities using time components without communicating Nonces or Nonces may be used less regularly while the time components may be used more frequently. An example embodiment may be that a temporary identity may be created by means of Nonces and/or time components every day and thereafter hourly temporary identities may be created at each of the entities using only the time components. A new Nonce may be generated the next day and new temporary identities based on that Nonce and time components are generated every hour the next day. Similar embodiments and/or variants to those described herein may also be used.

In example embodiments, the temporary identities may be used for communication between the network and the application. The application may use USERtempID for communications with the network while the network may use the UEtempID to communicate with the application. The UEtempID may be used by the UEs as the Identity of the UE instead of the IMSI to advertise or discover other UEs for D2D or for Proximity Service (ProSe). The application and the network may then perform a mapping of the two temporary identities. Alternatively, a temporary identity may be used as input to derive a unique temporary identity that may tie the two domains (e.g. application and network) in cryptographic manner (e.g. TempID(domain 2)=KDF (Key, TempID(domain1)) (e.g. which may be used for communication between UE's may advertise these temporary identities over the air).

According to an embodiment, a Prose Identity Service Function (PISF) may offer services for temporary identity generation and mapping. These services may be tied to an MNO or offered as third-party service. A ProSe temporary Id (ProSeID) may be created for such services or if the PISF may be located within an MNO then the UETempID may be used as the ProSeID. A UE may request a ProSeID from the PISF or alternatively, the ProSeID may be pushed by the PISF to the UE.

Based on privacy requirements, the ProSe identities may be temporary identities with associated lifetimes. A new ProSeID may have to be re-generated before the expiration of the lifetime associated with the old ProSeID. The old and the new ProSeIDs may be mapped for a limited amount of time so there may not be synchronization issues during the discovery process. Using a pull or push approach the UE either requests for a new ProSeID or is pushed with the new ProSeID.

Figure 5:
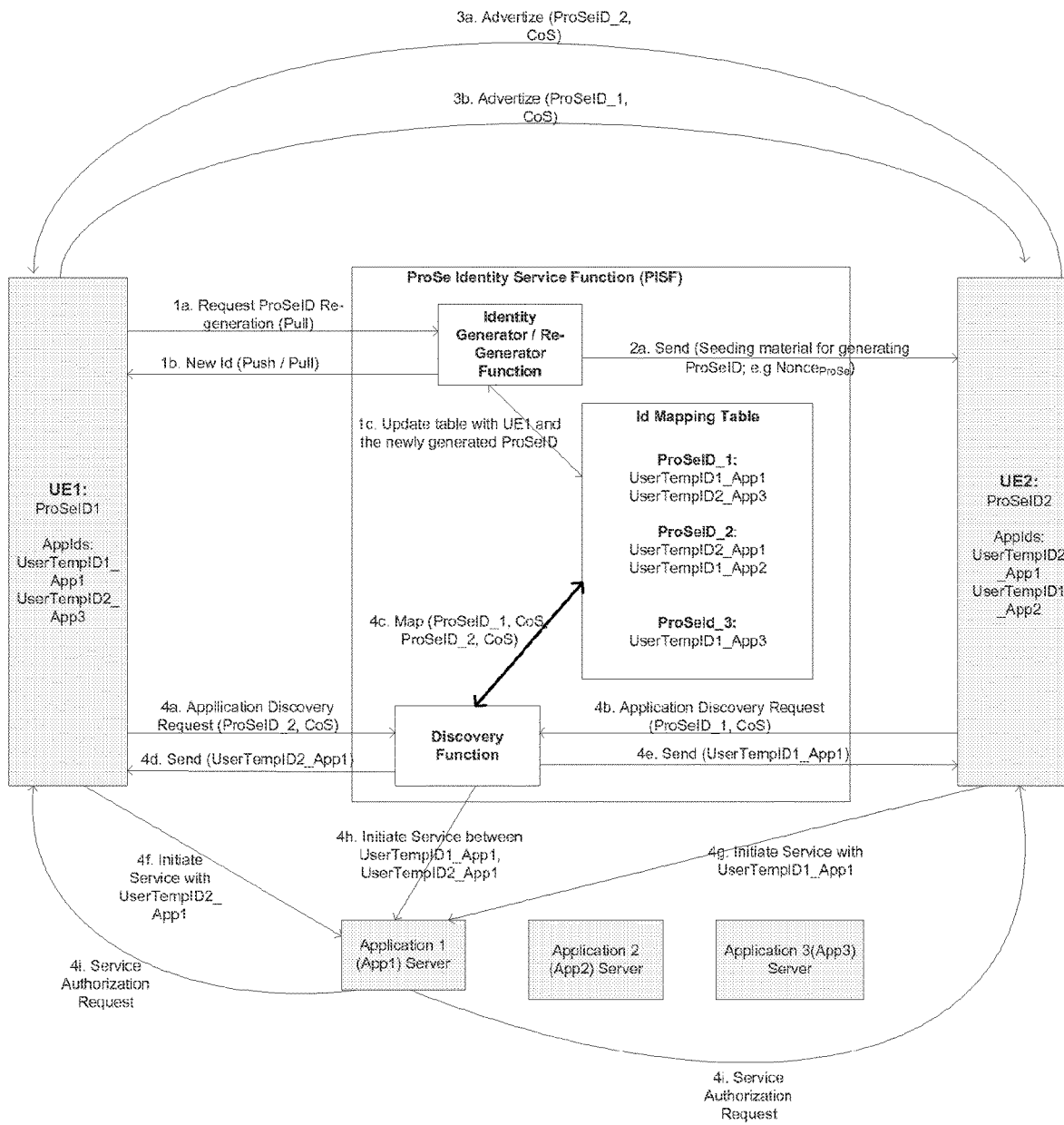
FIG. 5 illustrates an example embodiment of a ProSe identity function.

FIG. 5 illustrates an example embodiment of a ProSe identity function. As shown in FIG. 5, in Message 1a, the UE1 may request for ProSeID and the PISF may send the newly generated ProSeID as shown in Message 1b. Alternatively, the PISF may generate a new ProSeID before the expiration of the lifetime of the ProSeID and send the new ProSeID to the UE using Message 1b without receiving a request Message 1a. An embodiment may be for the PISF to generate the seeding material required for generation of the temporary ProSeID and send only the seeding material to the UE as shown in Message 2a. A Nonce$_{Prose}$ may be sent by the PISF in response to a request or pushed to the UE which may then be used by the UE and the PISF to generate the ProSeID, where ProSeID=(Key$_{ProSe}$, Nonce$_{ProSe}$) where the Key$_{ProSe}$ may be a shared secret between UE and the PISF. Alternatively, the UE may send seeding material to the PISF to generate the ProSeID or seeding material from both the UE and the PISF that may be generated at each end and communicated to one another and then used by both the entities for generating the ProSeID. Alternatively, the ProSeID may be self generated by both the UE and the PISF using time components (such as date, time, and the like.) periodically. The periodicity may be agreed upon during the registration process. This may enable both the UE and the PISF to avoid communicating Nonces between the entities thus saving resources and improving latencies. Alternatively, Nonces may be used during the initial generation of the ProSeID and thereafter the temporary identities may be created at UE and PISF using time components without communicating Nonces or Nonces may be used less regularly while the time components may be used more frequently. An example embodiment may be that a ProSeID may be generated by Nonces and/or time components each day at 6 am in the morning and thereafter hourly ProSeIDs may be generated at each of the entities using only the time components. A new Nonce may be generated the next day and new ProSeID based on that Nonce may be generated and then using only time components ProSeIDs are generated every hour. Similar embodiments or variants or combinations of the embodiments or variants described here may also be used.

The ProSe discovery and/or advertise Message 3b, may carry the ProSeID of UE1 (ProSeID_1) similarly UE2 may advertise ProSeID_2 as its ProSe identity in Message 3a. In addition to the carrying of the ProSe identities each discovery and/or advertisement message may optionally also carry a Class of Service (CS) associated with the ProSe Identity. Additionally, a UE may be associated with more than one ProSeID, wherein each ProSeID may be associated with a class of applications or services. Gaming may be an example of Class of Service, similarly social networking may be a class of service that may also have different security and privacy requirements. A UE may have a ProSeID for Gaming and another ProSeID for Social networking.

The PISF may also implement a Discovery Function, which aids in mapping the ProSeID to the appropriate applications and respective temporary application identities. The PISF may act as manager of multiple applications mapping to the same but unique ProSeID (e.g. mapping CompName.GameName.CompNamexyz.Application_abc.UserTempID1 to ProSeID1, and the like). In addition, the PISF may act as entity which connects two users who have an interest in a common ProSe connectivity with discover and attach function. The PISF may also perform filtering and data collection for ProSe Users and may report such information to Applications Servers. The PISF may also maintain database of discovered ProSeIDs by each UE and also provides for ProSeID refresh functions to provide for privacy protection. Also, the PISF may enable linking of old and new ProSeIDs including when filtering discovery data. In embodiments, the PISF may also proxy some of its functions to the UEs (e.g. filtering at a level of an application service name such as CompName.GameName.CompNamexyz.Application-_abc.UserTempID1). The PISF may use an Identity mapping table that maps the temporary ProSeID of a UE to the temporary application identities that the User has subscribed to. As shown in FIG. 5, the Mapping table may include a mapping for UE1 with an associated ProSeID_1 with associated application temporary identities: UserTempID1_App1 and UserTempID2_App3. Similarly, UE2 that has a ProSeID_2 may be associated with application identities: UserTempID2_App1 and UserTempID1_App2. As can be observed that both UE1 and UE2 have an association with Application App1. UE1 that may be associated with ProSeID_1 may receive a ProSe discovery message, Message 3a, from UE2 including UE2's ProSeID (ProSeID_2) and optionally a class of service (CoS) indication. Similarly, UE2 may receive a discovery and/or advertise message from UE1 including UE's ProSeID_2 and optionally a CoS indication. UEs may perform some form of filtering on the discovery and/or advertise messages received and in addition detects and collects measurements for each ProSeID detected, may perform a scan and detect on a regular basis or time interval and filters discovery data so as to avoid false alarms and false triggers and transient conditions. For example, if a particular ProSeID may be discovered on x consecutive scans then it may be considered detected. Similarly, for loss of detection and reports, changes in what may be detected may be sent to the PISF function in order to limit communications bandwidth (e.g. when a new ProSeID may be discovered or lost, the information may be sent to the PISF).

In an embodiment, following the reception of a discovery message UE1 may send an Application discovery request Message 4b to the PISF's Discovery Function to discover the application identity and the application to invoke in order to communicate with UE2. Message 4a may include the ProSeID_2 and may also have the associated CoS that the UE1 received from UE2. A similar request from UE2 including ProSeID_1 that UE2 may have received from UE1 and also an associated CoS may be sent to the PISF's Discovery Function in Message 4b. Although it may be be sufficient to receive either Message 4a or 4b, the PISF may be able verify with a certain higher degree of assurance about the requests if it received application discovery request messages from both the parties involved instead of receiving it from one of the UEs. The Discovery Function may then infer that both UE1 and UE2 may be requesting ProSe services to one another based on the table lookup of the Id Mapping Table. Message 4c may be used by the Discovery Function to obtain the application identities of both UE1 and UE2's where their ProSeIDs and also optionally the CoS associated with each of the UEs may be sent. As a result of (e.g. in response to) Message 4c, a lookup may be performed wherein the ProSeIDs of both the UEs may be compared against the applications they are subscribed to and optionally may compare the CoS that they belong to. If both the UEs may be associated or subscribed to the same Application or application class or class of service then the respective application identities may be obtained. The Discovery Function may also discover that UE1 and UE2 may be both subscribed to App1. Using Message 4d, the Discovery function may send the UserTempID2_App1 to UE1 and, using Message 4e, the UserTempID1_App1 to UE2. Alternatively, the PISF may communicate directly with App1 using Message 4h to initiate service between UserTempID1_App1 and UserTempID2_App1. Messages 4d and 4e may be optional and Message 4h may be carried out. Alternatively, Message 4f may be carried out and then App1 may initiate service and authorization request using Message 4i with UE2 using Application identity UserTempID2_App1. Additionally, Message 4g may be carried out in which case the App1 initiates service and authorization request using Message 4i to UE1 using Application identity UserTempID1_App1. Alternatively, Messages 4d, 4e, 4f and 4g may be skipped and only Message 4g may be sent by the PISF/Discovery Function. App1 then using the application identities of the UEs may initiate a service between the two UEs by sending authorization requests to both the UEs using Message 4i. Alternatively, if the PISF may not be able to discover the right application since the ProSeID may be a one-to-many Application Id mapping, the PISF may send request to the UEs the applications that both the UEs have subscribed to in order to decide the application that the UEs would like to use. The PISF may also invoke all the applications that may be common to both UE1 and UE2 and provide each of the applications with the associated application identities of the UEs. As part of Messages 4d and 4e, the UE1 and UE2 may receive multiple application identities of the target UEs which may be used by the UE to choose who connect with. The PISF may prioritize the applications that the UE may choose based on agreements with the respective applications.

According to embodiments, UEs may maintain a list of temporary identities of other UEs or users/subscribers of interest such that in an active discovery scenario, the amount of tracking and discovery, and, thus, the impact on UE resources may be reduced. Similarly, the network may communicate information about UEs that may be of interest or in a consolidated manner to the application, thus, reducing the load on the network.

Additionally, each UE may be able to include its own UE identifier information (such as the IMSI or other identifier) into the broadcast service name such that each UE may be broadcasting a completely different temporary service names. Other UEs belonging to the same service may use the combination of known TempIDs of other UEs and the "master service key" to derive locally a list of temporary service strings that such UEs may advertise and check the broadcast string for a match. UEs not subscribed to the service may not be able to perform such a procedure and, thus, may not even be able to understand that the different service identifiers broadcast by the different UEs may, in fact, be advertising the same service.

According to an embodiment, cross-layer communications for discovery and management may be provided and/or used (e.g. may be optimized). To provide presence based services via the application server, the UEs may advertise their identities and service requests or availability. Since the application server may be the end point that may manage the presence service, information gathered by the UEs may be communicated to the application server. However, the volume of information may grow exponentially when the information being sensed, the frequency of communications, the number of UEs participating, and the like may be considered or taken into account. To reduce the communications, the information may be filtered locally at the UE and the filtered information may be communicated upstream to the application server. The hierarchy described herein to identify a specific service session may be used as the basis of a filtering function according to an embodiment. Additionally, such attributes may be used to provide filtering locally at the UE through policies provisioned in the UE to reduce communications to the application server. These policies may be proxy policies reflecting the network level policies and may be faithfully executed on the UE in a trustworthy manner (e.g. via a suitable secure, protected and trustworthy policy execution). In embodiments, either a random temporary ID or human readable IDs may be used for hierarchical filtering. In the former case a short string generated from the temp identity may be used for initial filtering at the UE with the longer string verified via direct UE-UE link or through the application server. In the latter, the naming convention may imply hierarchical sets of users where each may be a strict subset of its superior.

For example, the CompName.GameName.CompName-GroupXYZ.Applicationabc naming example described above may be used to provide progressive reduction of traffic by filtering locally. In such an embodiment, the "CompName" level may provide the lowest level of filtering, isolating service discovery information at the UE except, for example, for those provisioned by CompName. The "CompName.GameName" level may provide the next level of filtering, isolating service discovery information at the UE except, for example, for those provisioned by CompName for the GameName application service. The "CompName.GameName.CompNameGroupXYZ" level may provide the next level of filtering isolating service discovery information at the UE except, for example, for those provisioned by CompName for the GameName application service for the specific CompName+CompNameGroupXYZ circle group. The "CompName.GameName.CompNameGroupXYZ.Applicationabc" level may provide the highest level of filtering, isolating service discovery information at the UE except, for example, for those provisioned by CompName for the GameName application service for the specific CompName+CompNameGroupXYZ group and the Applicationabc application session.

Additionally, the discovery information may be further tailored similar to radio measurements used for handoff operations and QoS management. For example, the frequency of measurements that may be carried out and how often these measurements may be reported to the application server may provide further means or information that may be used for managing the traffic.

Depending on the settings for various application services, the policies provisioned on the UE may also allow for fine-tuning and tailoring of the discovery information traffic to the application server and, thus, may enable optimization of communications while still providing a high quality service.

According to another embodiment, service access with a D2D service may be provided and/or used. For example, an interaction between the network and the application server service, discovery, and registration for a specific case of device-to-device communication may be provided and/or used In such an embedment, such a message flow may be seen as a particular example of the procedure described above and shown in FIG. 1 where a D2D server may be introduced as a new core network node and/or function responsible for managing D2D-related information in the network. The D2D server may be the core network entity that may interact with the application server for negotiating service access for services and/or application that may use or benefit from direct D2D links.

In an embodiment (e.g. where there may be no interface with the application server), the D2D server may interact with the UEs to receive D2D related information as described above and determine service parameters.

Figure 6:
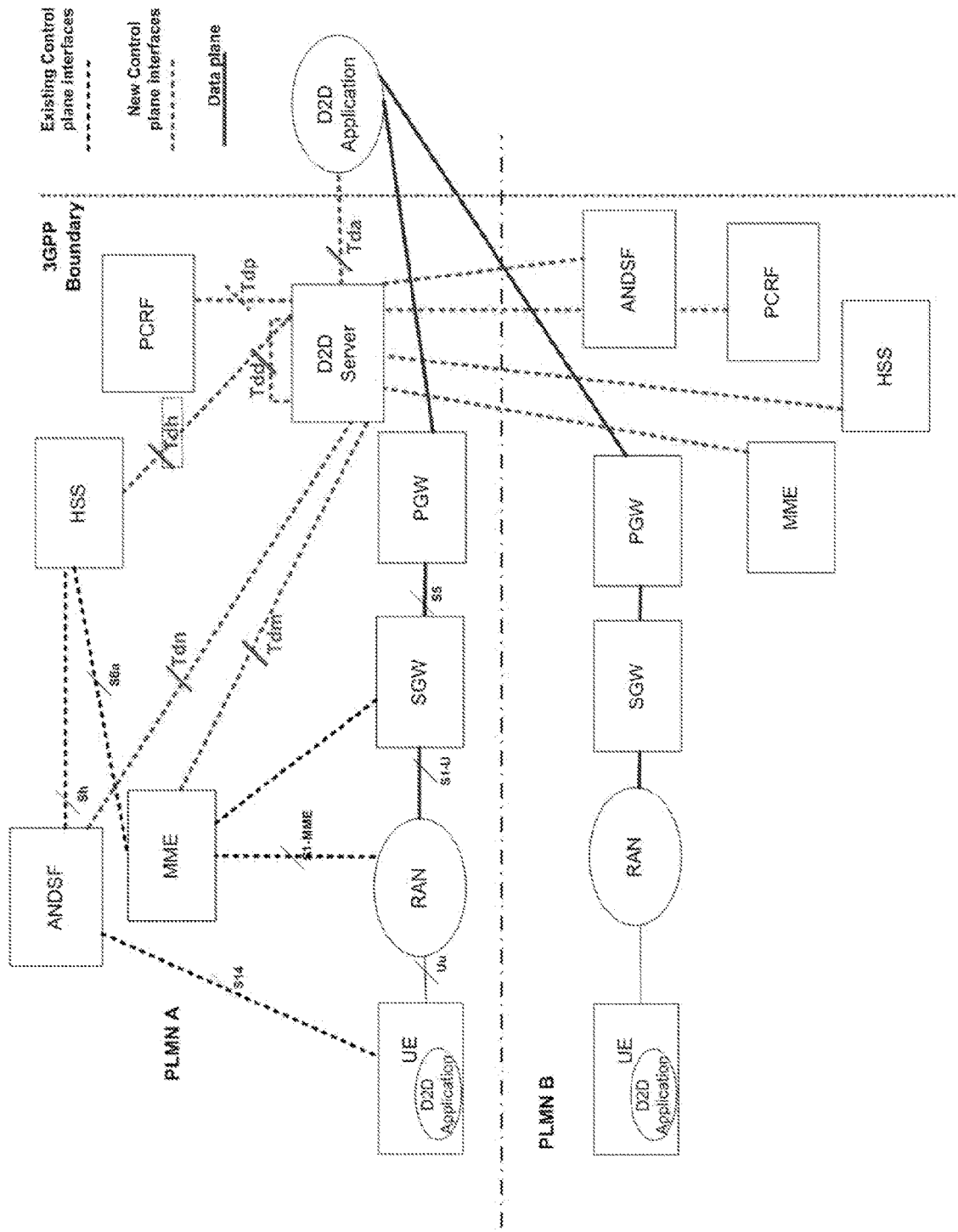
FIG. 6 depicts an example embodiment of an inter-operator D2D architecture.

An example embodiment of an EPC architecture (e.g. in 3GPP) with a D2D server (e.g. an inter-operator D2D architecture) may be illustrated in FIG. 6. In such an architecture, the D2D server may be in a domain of one operators (e.g. PLMN A), but may be accessible to the nodes in another operator (e.g. PLMN B). Additionally, new interfaces between the D2D server and various existing entities in the EPC such as the MME, HSS, PCRF and ANDSF may be provided and/or used. In an embodiment, the data plane may remain unaffected in such an architecture, and the new interfaces may be used to the control plane.

Figure 7:
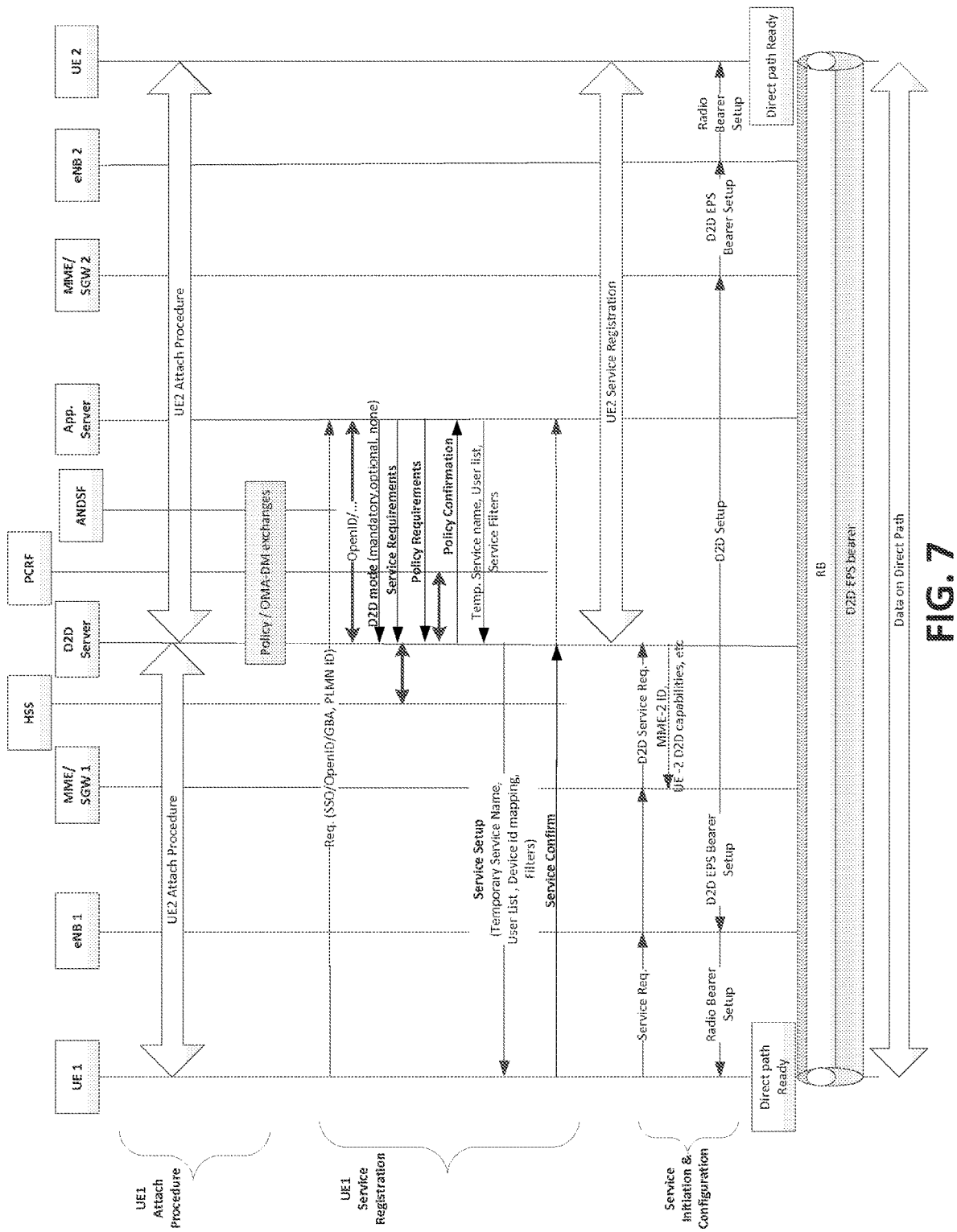
FIG. 7 depicts an example embodiment of D2D service registration and access.

FIG. 7 provides an example embodiment of a call flow that may describe the sequence of events from an attachment of a UE to a network (e.g. a 3GPP network) when it engages in a D2D session with another UE. As shown in FIG. 7, the flow may be divided into three segments. In the first stage, the UEs may attach themselves to the network (e.g. the 3GPP network). As part of the attachment process, the UEs may also obtain their D2D device identifiers that they may advertise so other UEs may locate them using device discovery procedures. At the end of the attach process, the users may already be authenticated with the network and the network may have verified that the corresponding users may be allowed to obtain D2D services. The D2D server may also exchange signaling with a PCRF and/or ANDSF.

In the second stage (e.g. the service registration procedure), the users may register themselves with one or more application servers depending on the services they may use or need. As part of the Service Request, the user may send an OpenID, GBA, SSO or other identity associated therewith. Additionally, in an embodiment, as part of this request, the user may also send the PLMN ID and/or other parameters related to the cellular network. This may enable the application server to take advantage of the fact that the user may already be authenticated in the network (e.g. the 3GPP network) and may enable it to contact the relevant D2D server. The application server and D2D server may first use OpenID, SSO or other protocol to authenticate the user. The service request may also inform the application server whether the UE may be requesting a unicast or a multicast service.

Then, the application nserver may send the D2D configurations supported by the service being requested by the user to the D2D server. The D2D configuration may include (e.g. but may not limited to) a D2D operation that may be mandatory for using the service, a D2D operation that may be optional (e.g. UEs may participate in the application irrespective of whether they are in D2D or in baseline cellular mode); a D2D operation that may not be allowed in the particular service; and the like.

Additionally, in an embodiment, the D2D server may function as the control interface between the application server and the network (e.g. the 3GPP network) even when D2D services may not be used.

The D2D server may also receive the service requirements in terms of QoS, and the like from the application server and may confirm by interaction with a HSS whether a particular UE may be permitted to obtain these services.

The D2D server may further receive the D2D service specific policy requirements from the application server and may confirm, for example, by interaction with the PCRF whether the UE may be able to satisfy these policy requirements.

In an embodiment, confirmations may be provided to the application server. The application server may then provide the D2D server with a temporary service name that may be the name that may be used to identify such a service within the network (e.g. the 3GPP network). A list of other users that may be currently registered to the service (for e.g., a friend's list) may also be provided. The D2D server may be provide these (e.g. the list) as well as the mapping between the service identities and their corresponding device identities that may be used by the UE for device discovery. Then, (e.g. as a final part of the service registration process), the UE may send a confirmation to the application server.

After service registration may be performed, the last sequence or stage in FIG. 7 shows the initiation of D2D service between UE1 and UE2 (e.g. after both UEs may have gone through the attachment and registration procedures described above). During this phase, the D2D EPS and Radio Bearers may be established. The D2D server may play a particular role here by providing target MME identifier information (such as IP address) to a source MME, and arriving at an acceptable configuration after reconciling the UE capabilities, among other functions.

Figure 8:
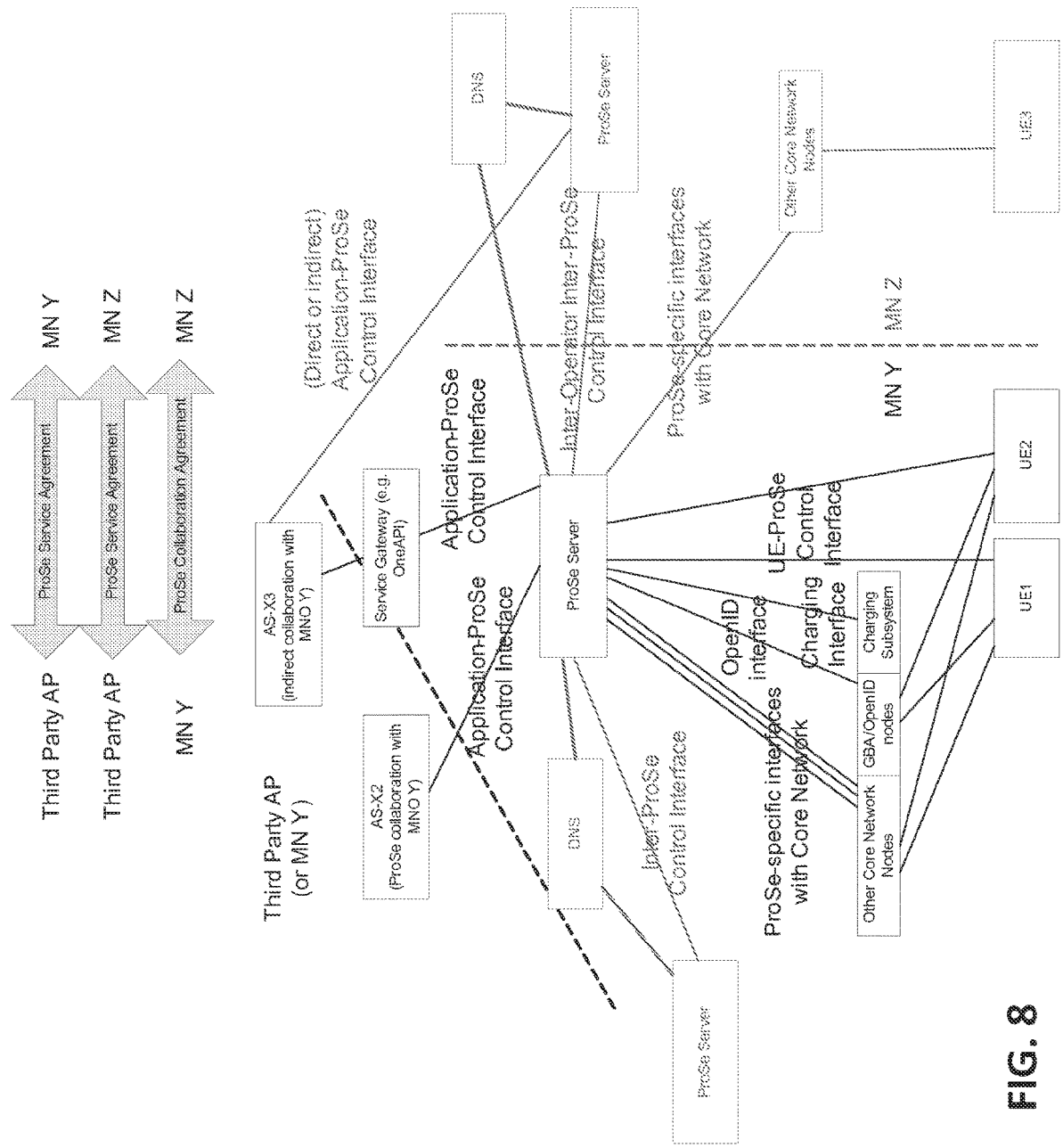
FIG. 8 depicts an example embodiment of an architecture that may be used for ProSe as described herein.

According to another embodiment (e.g. the second embodiment), a ProSe control interface operation, for example, based on an operator provided identity. In such an embodiment the ProSe server may be an equivalent to the D2D Server (e.g. of a first embodiment). An overview of the ProSe architecture that may be used herein may be shown in FIG. 8.

Additionally, in this embodiment, the MN Operator provided identity (e.g. the OPI acronym described herein) may be used as an intermediate layer of identity between the cellular network UE identities (e.g. TMSI, MSISDN) and the user's Application Layer User Identity. According to one embodiment, OpenID (e.g. an OPI derived from the OpenID protocol) may be a primary example of such an OPI. However, in additional embodiments, another technology such as Liberty Alliance Identity Federation Framework may be used instead (e.g. as long as it may be integrated with the PLMN authentication system (e.g. GBA) and where an "OPI Identity," as opposed to the "Application Layer User Identity" such as the Facebook login handle may be used and/or provided).

If multiple application identities may be mapped to a single OPI, the discovery event itself may be ambiguous in the sense that it may not by itself determine which application caused it. An additional stage may then be provided and/or performed which may include, for example, one of the following. In one embodiment, each of the applications in the group may contact their application servers to verify which application or server may be the one that caused the discovery. In another embodiment, the UEs may establish a secure channel and exchange their application IDs to see which applications match. The secure channel key may be based on the ProSe ID. Such a method may reduce the network load. In another embodiment, the UEs may create a secure channel based on the application ID but that the application ID may not be reconstructed from it and may use such a channel to verify which application may have invoked the discovery. If the application IDs do not match the channel may not work, and, thus discovery information, may be available to the legitimate application. In an embodiment, such a method may be used with application derived IDs as well.

Proximity services that may be implemented may be supported by a Proximity Server (ProSe Server in this embodiment). The ProSe server may offer an interface to both the UE and the Application such as an API based on HTTP, SIP or other protocols. Additionally, the interface between ProSe Server and the UE may be over NAS signaling (e.g. that may ensure proper confidentiality and authentication of the UE). To enable ProSe services, the UE may register with the ProSe server, specifying an OPI identity, the Application ID and possibly adding application specific configuration. Then, the user may log in Application X and may use ProSe services to discover and communicate device-to-device (D2D) with other application subscribers. According to an embodiment, the user may also not log in the application immediately, but may still be discoverable by other application subscribers.

In terms of identity, the ProSe Server may maintain a mapping between the OPI identities and the cellular network identities (e.g. for users currently registered with the service) and the Application may maintain a mapping between the OPI identity and the Application Layer User Identity (e.g. a user name) for the subscribers of the Application.

ProSe features described in s embodiment may include D2D communication, proximity discovery, Application Wakeup Notification (e.g. that may be used where a user register for ProSe service but does not log into the application), and the like. Additional support procedures may also include OPI identity verification.

The ProSe Server may also support charging the application provider for ProSe operations and D2D communications, for example, through a minor usage extension of the existing Sponsored Data Connectivity feature.

In an example embodiment, a user may decide to use an application, may connect to it, may create an account with a user name, and may additionally enter an OPI identity to identity the user for ProSe services (e.g. Alice@mno-y.com may be provided by MNO Y that may further tell the Application which MNO to communicate with). The application may also obtain and/or verify the OPI identity and from this point on Alice may use ProSe services provided through this Application. According to an example embodiment, Alice may register with the ProSe server and include this OPI identity, the name of the Application and some application specific configuration to activate this Application ProSe services, which may be performed at any time (e.g. even when Alice may not be logged in the Application). The Application may be notified and/or may obtain the user application specific configuration when one of its users registers for ProSe services. For example, Alice may specify that a certain set of friends may initiate discovery with her, and that her current device may have video or other capabilities.

Figure 9:
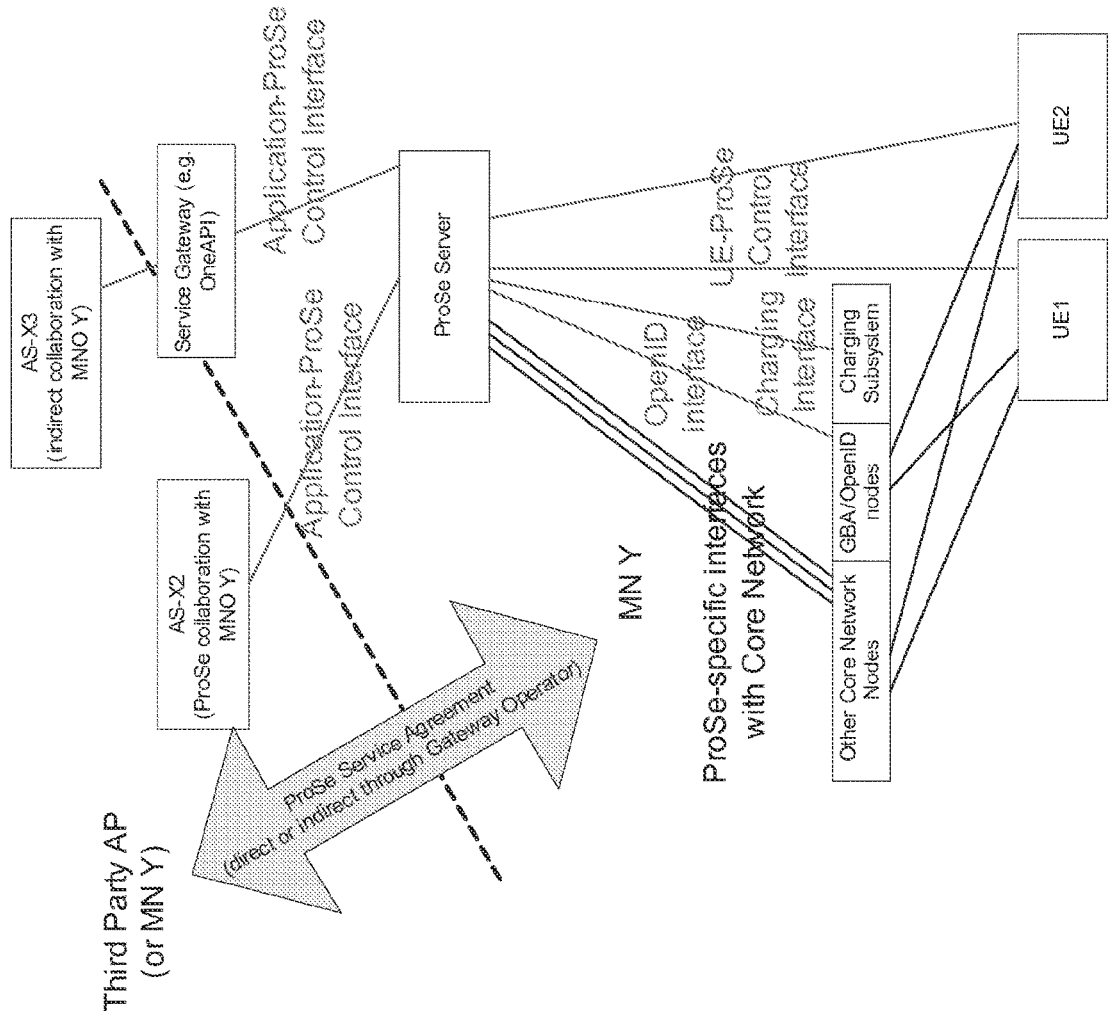
FIG. 9 depicts an example embodiment of an architecture that may be used as described herein.

FIG. 9 depicts a network architecture overview for embodiments that may provide and/or use the ProSe control interface operation based on an OPI as described herein. For example, an AP X may have a ProSe collaboration agreement with MNO Y such that the AP X and MNO Y may have agreed to provide ProSe services to a set of subscribers of AP X. Such an agreement may be direct for AS-X⅓, or indirect as in the case of AS-X2, where AS-X2 may be collaborating with an API gateway such as an extended OneAPI gateway (e.g. where the API gateway may be mediating the interconnection between the AS and the ProSe server).

Additionally, a variation of such an embodiment may be used to enable a case where there may no interface between the Application and the ProSe server, a variation of such an embodiment may facilitate D2D communication when UEs are out of coverage, and/or extensions to cover cases where multiple ProSe Servers or MNOs may be involved as described herein (e.g. below).

According to an embodiment, OpenID identities may be provided and/or used, for example, as Intermediate Identity Layer. For example, MNO provided OpenID identities may be provided and/or used as intermediate identities between the UE, ProSe Server and Application. Additionally, in embodiments, identities that may be derived using other authentication schemes integrated with MNs (e.g. Liberty Alliance) may also be used.

As described in embodiments, the UE may provide either a MSISDN or a pseudonym to the Relying Party (e.g. a RP that may be typically implemented as part of the AS), such that the NAF/OP (e.g. that may be part of the GBA/OpenID nodes in the CN depicted in 0) may recognize this information and associate it with 3GPP identity information. Additionally, in embodiments, the NAF/OP may receive an IMPI, MSISDN or other identifiers that may be stored in the USS (e.g. User Security Settings or GBA USS that may be provided, defined, and/or used). The USS may include user IDs (UID) such as firstname.lastname@example.com or my.pseudonym@example.com. As such, the current integration of GBA with OpenID may enable several OpenID identities to be available to the end user.

In an example embodiment, the operator may provide techniques to create new IDs including human generated or machine generated pseudonyms (e.g. either through a web portal or through a local application on the UE automatically triggered when the UE access a new application using OpenID where the user may select an existing OpenID or create a new one for the application). In this embodiment, the local application may connect with a service provided by the MNO such as an OpenID identity manager service that may create and return the new ID, and may store the ID in the user profile's USS in the HSS.

According to an embodiment, it may be beneficial to use an MNO provided identity as an intermediate identity so the ProSe server may verify that this identity may effectively belong to the subscriber (e.g. by checking with HSS). Additionally, the intermediate identity may be a long lived identity that may enables a user to turn on ProSe detectability without being logged in the Application.

An example of a user identity set associated with applications may be as follows or may include one or more of the following: alice.smith@mno1.com may be an identity that she may choose to use with several work related or government related applications; <MSISDN>@mno1.com may be an identity that she may choose to use with several telephony related applications; abc123ab12@mno1.com (e.g. generated on demand by MNO 1) that she may use to log on an online file hosting service; 567abc12dc @mno1.com and 789cde34ed@mno1.com that may be different IDs that she may uses to log in CompName Mail, CompName Talk and other CompName applications (e.g. where CompName may not be aware that these accounts may be from the same physical person); and the like.

In embodiments, some application providers may have a policy that may preclude users from having more than one account (e.g. that may preclude users from having two or more different accounts). The embodiment disclosed herein may support such a type of policy since OPI identity which is provided per cellular user and Application Layer User Identity may be orthogonal, and may be related through a mapping in the application.

Additionally (e.g. on ease of utilization verses privacy), to minimize user involvement, a user may use a single OPI identity with services. This may enable or make it possible for a third party to correlate this user's involvement with different applications. Several levels of pseudonym identities (e.g. one for work, one for games, and the like) may be provided and/or used (e.g. which may be a little or slightly more secure). Additionally, the user may choose to use one or more individual identities per application.

According to an embodiment, a UE-ProSe control interface (e.g. for service registration) may be provided and/or used. For example, a user that may wish or want to benefit from a ProSe service related to an Application X (e.g. such as a proximity discovery and device-to-device communication) may register with the ProSe server using the proper OPI identity (e.g. the OPI identity that the Application X may have associated with the Application identity of the UE's user. In an embodiment (e.g. typically), NAS signaling may be used between a UE and ProSe Server such that the UE may be authenticated and the ProSe server may communicate with the HSS to ensure that the provided OPI identity may indeed belongs to the user (e.g. it may be listed in the USS of the subscriber's profile). An alternative embodiment may include using application signalling (e.g. HTTPS) between UE and ProSe server. In this embodiment, the GBA/OpenID integrated procedure may be used to properly authenticate the user. According to an example embodiment, NAS signaling may be provided and/or used since it may be secure and authenticated ensuring that the ProSe server may know the identity such as the 3GPP identity of the UE (e.g. and, therefore, may obtain the subscriber profile from HSS). In an alternate embodiment, the ProSe server may query the HSS to obtain the subscriber profile related to the given OPI identity. NAS signaling may also be provided and/or used if a ProSe server may be part of the EPS. As the ProSe server may interface several other entities within the EPC, it may be considered part of the EPC, not external thereto according to an embodiment.

Explicitly registering with the Proximity Service feature (e.g. a benefit thereof) may enable fine grained control of the ProSe service by the user. For example, the user may wish or want to opt-out of any proximity service (e.g. to save battery power), even if logged in an application. The user may select which application it may want or wish to use proximity services with. Even within one application, a user may want or wish to use proximity services when using one application identity and not with another. Additionally, a user subscribing to several cooperating applications may benefit from using the same identity with each of these applications. For example, applications such as D2D video applications may work with different PLMNs operating in the same area and may decide to enable interworking ProSe features between their users.

Once the UE may be authenticated with the ProSe Server, it may send one or more parameters of this registration including, for example, one or more of the following. For example, the UE may include or send an identity of accepted applications such as app-name@app-domain.com that may be the name that the application may use to identify itself when using the ProSe API. Along with application IDs, the UE may also include a list of authorized ProSe functions for this application (e.g. discovery, application notification, and the like).

Additionally, an application specific configuration may be included or sent (e.g. by the UE). For example, an application specific configuration may be opaque data to the ProSe Server, and may, for example, include or be an XML document. To ensure that the MNO may not access this information, the application specific configuration may be made confidential by encrypting it using a public key provided by the application in an embodiment. Additionally, the application may obtain this configuration from the ProSe Server (e.g. through a notification from the ProSe Server). One example of usage may be to limit discoverability to a limited set of other application subscribers (such as friends or circles in social network applications). Another example of usage may be to provide a description of the capabilities of the device (e.g. whether the device may have a video capability and/or other capabilities).

In an embodiment, since UE-ProSe server communication may be (e.g. typically) through NAS signalling, the ProSe server may have the identity of the device (e.g. TMSI) and, therefore, may know which device may be registered with the given identity. Additionally, the application may not know and may not care about it (e.g. the device and/or the given identity) except for application-related capabilities such as the support for video that may be conveyed through the application specific configuration described above. When the ProSe server may receive a request mentioning an OPI identity, it may check if a device may be currently logged on or in with the given OPI identity. As such, the ProSe server may map the OPI identity with the subscriber (e.g. Alice as represented by her subscriber identity on the USIM) and also with the device currently registered for this identity, which may enable the Proximity Services (e.g. device-to-device communication, proximity detection, and the like).

A user identity over the UE-Application interface may also be provided and/or used as described herein. For example, in embodiments, the UE may be authenticated, for example, twice with the Application (e.g. once with an OPI identity, and once with an Application Layer User identity). These levels of authentication may be integrated or at least the impact on the user can be minimized as described herein.

For example, in an embodiment (e.g. case 1), an Application Provider may use its own application layer authentication scheme (e.g. a socially networking application login). To be able to use ProSe services through this application, the user is requested to additionally enter an OPI identity in its application profile. From this point on the Application can map Application ID and OPI identity.

In another embodiment (e.g. case 2), an Application Provider may choose to authenticate the user through her OPI identity. In such an embodiment, the Application Layer User identity and OPI identity may the same and no mapping may be used or provided.

Additionally, in an embodiment (e.g. case 3), an Application Provider may authenticate the user through either the Application Layer User identity or OPI identity. For example, a service such as Facebook may generally accept application layer login, but may also accept OpenID identities from certain OpenID providers such as MNOs providing ProSe services. The client application or agent on the UE may, therefore, log into the application using a selected OPI identity. In an embodiment, the Application may (e.g. the first time) propose the user to log in an existing account and may record the mapping between Application ID and OPI identity. As such, the next time or access attempt, the Application may automatically log the user in this account.

According to an example embodiment, an Application-ProSe control interface may be provided and/or used (e.g. for service requests) as described herein. For example, the Application-ProSe server control interface may be either a direct interface or may instead exist through an API gateway (e.g. an extended OneAPI gateway). A use for this interface may be to convey proximity service requests. Such requests may include one or more of the following: aD2D communication, a Proximity Detection, an Application Wakeup Notification, and the like (e.g. which may be described herein). Additional functions maybe enabled over this interface such as OPI identity verification and/or registration to be notified when a UE may activate the ProSe feature. According to example embodiment, the information provided by the Application to the ProSe server in such requests may include one or more of the following: an Application ID (e.g. an identifier that may be provided by AP or MNO and may be agreed upon as part of the ProSe service collaboration agreement); a type of the request (e.g. a D2D communication, a Proximity Detection, an Application Wakeup Notification, and the like); the OPI identity of the principal (e.g. the user which originated this request); the OPI identities of other users (e.g. peers for D2D communications, a group of friends for proximity detection, none for Application Wakeup Notification, and the like); some traffic filters that may identify the traffic flows over the D2D communication; and the like.

Additionally, in an embodiment, the Application-ProSe control interface may be implemented as a secured web service. For example, if a gateway may be provided and/or used, different protocols may be provided and/or used on both sides of the gateway.

Charging may also be provided and/or used as described herein. In an embodiment, the Proximity Server may be interconnected with the charging system (e.g. offline OFCS, typically over Rf/Mf, or online OCS typically over Ro/Mo where Mo/Mf may be equivalent interfaces to Ro/Rf that may be currently provided and/or used and may be based on Ro/Rf with added features such as an additional layer of security).

In an embodiment, for Proximity Service charging, the Application Provider may be or may have been charged for the service. To enable such a model, an existing Sponsoring Data Connectivity feature (e.g. that may be currently defined and/or provided including an informative overview) may be extended. Today, it may be enabled over the Rx interface between the AF and PCRF. The PCRF may then communicate with a PCEF/BBERF (e.g. a PDN Gateway) to setup or update the bearer. The PDN Gateway may communicate with the charging system. For example, it may send accounting records over Rf to the offline charging system or usage data that may be recorded over Ro to the online charging system. The Ro/Rf interfaces may support setting the sponsor identity in Sponsor-Identity AVP (e.g. the same AVP as defined for the Rx). Alternatively, a specific charging key may be used by the charging system to correlate the charging records with the Application Provider.

According to an example embodiment, the ProSe Server may put the Application Provider identity as the sponsor over Ro/Rf or Mo/Mf and/or may use a specific charging key associated with a specific Application Provider. Such embodiments may not use a signaling change, but may include a new usage of existing signalling (e.g. since this new sponsoring feature maybe for data connectivity as well as charging events and since another entity other than the PCEF or BBERF may make use of the feature).

Additionally, when the ProSe server may communicate D2D policies to the PCRF over, for example, Rx, it may also set the sponsor identity (e.g. using the AVP discussed above) assuming that this session may be paid by the AP.

As such, in embodiments, charging the Application Provider for ProSe operations may be enabled by having the ProSe server using an extended "Sponsored Data Connectivity" PCC feature on one side (e.g. to charge for the ProSe service itself) and may use the existing "Sponsored Data Connectivity" PCC feature on the other (e.g. to charge for traffic over D2D connection).

Security features and/or aspects may also be provided and/or used as described herein. For example, in an embodiment, a risk of a UE using a fake OPI identity with a ProSe server may be mitigated. As described herein, a method of communication between the UE and ProSe server may be via or over NAS signalling. This may ensure that the UE may be authenticated and the communication may be secured. The ProSe server may, therefore, know the cellular network identity (e.g. TMSI) of the UE. The ProSe server may then obtain the subscriber profile from the HSS and may verify that the given OPI identity may indeed be listed in the USS section of this profile.

In an embodiment, where the UE-ProSe Server communication may be at the application layer (e.g. HTTPS), a UE may authenticate with the ProSe server using GBA-Liberty Alliance, OpenID, and/or other integrated procedures such that the UE may not use a fake OPI Identity, because its MNO may be guarantying the link between the used OPI Identity and the UE identity such as the UE 3GPP identity. The ProSe server may obtain the subscriber profile from the HSS by using a query (e.g. a new query) to obtain the subscriber profile that may include a given OPI identity.

Additionally, in embodiments, a risk of a UE using a fake OPI identity with an Application may be mitigated. For example, the risk of a UE using a fake OPI identity with the Application may be mitigated through the use of an OpenID authentication procedure as described herein. In an embodiment (e.g. a case 1), the UE may authenticate with the Application Server using GBA-Liberty Alliance, OpenID, and/or other integrated procedures. Such an embodiment may be used if the application provider may have a service collaboration with the MNO. Additionally, in such an embodiment, the MNO may guarantee that this UE indeed holds this identity.

According to another embodiment (e.g. a case 2), the application may use other authentication schemes (e.g. OAuth or OpenID from a third party identity provider or an application layer authentication). To use proximity services the application may then provide a way (e.g. a web form) for the user to enter her OPI identity. The application may perform an authentication procedure (e.g. using integrated GBA or OpenID procedure) to verify that the OPI identity may effectively belong to the end user. In embodiments, the Application may not be aware that GBA/OpenID procedure may used. For example, the Application may know that the identity provider may be the MNO that may provide the ProSe service.

A risk of an Application using a fake UE OPI identity with the ProSe Server may also be mitigated. For example, the MNO may not blindly trust that the AP may use OpenIDs of its own subscribers. As such, in an embodiment, the ProSe Application API may include a "user_id_verification(OPI Identity)" function such that the Application may make use of verified OPI identities (e.g. requests involving one unverified OPI identity may be rejected. In some embodiments (e.g. where the MNO and AP may be the same entity), this (e.g. the function) may be omitted.

The verification API may involve the UE (e.g. which may be logged on both the Application and the ProSe Service at this time) as well as the Application. In this procedure, the ProSe may verify that the OPI identity given by the Application may be indeed logged onto the Application. For example, the ProSe server may send a random token to the application. The application may communicate it to the UE (e.g. through application signalling). Additionally, the UE may send the token through a ProSe Server-UE API function "user_id_verification_token(unencrypted_token)" to inform the ProSe server. In an embodiment, the UE may be authenticated with the ProSe server such that the ProSe server may know that the UE associated with the given OPI identity may indeed be in communication with the Application (e.g. because the UE may be communicating this information over a secure, authenticated application session between the UE and ProSe server). The OPI verification may be valid for a certain period of time and/or the procedure may be re-run periodically by the Application to account for users leaving an application. The identity verification procedure may be described in more detail below According to an embodiment, a risk of an Application using a fake App ID to charge another Application Provider may be mitigated. For example, an Application X may use the ID of Application Y when communicating to the ProSe Server to redirect the cost of usage to another Application Provider. To avoid such an issue, a secure connection between the Application and the ProSe server may be provided and/or used. Additionally, as part of the ProSe agreement between the AP and MNO, the AP may communicate its identity (e.g. a domain name) to the MNO or may obtain it from the MNO (e.g. an account number). Such an identity may be securely communicated during the interconnection setup (e.g. it may be guaranteed by a public key certificate that may be delivered by a trusted third party (Certificate Authority)).

In an embodiment, a risk of growing User Security Settings (USS) may be mitigated. For example, where GBA or OpenID integration may be used, the OpenID identities may be stored in the USS of the subscriber profile. In such an embodiment, one potential issue may include having various identities accumulated over a long period of time, leading to an ever-increasing size of the USS. To reduce such a drawback, the MNO may typically limit the number of identities. For example, a few long term identities (e.g. <MSISDN>@mno.com) may be set up by the MNO and may not be changed by the user. Additionally, the user may choose a few identities (e.g. first.last@mno.com) such that there may not be more than a fixed maximum number of these entries and/or to create a new identity the user may then delete and old one.

In embodiments, the MNO may also generate identities on demand (e.g. to be used with one particular application). These entries may be associated with a creation date or a monotonic number as part of the identity (e.g. <random>-12@mno.com, <another-random>-13@mno.com, etc.) or stored along with the identity. Additionally, when the maximum number of identities may be reached, the oldest generated identity may be deleted. Alternatively, in an embodiment, if the date-time of last usage may be stored along with the identity, the least recently used identity may be deleted instead. In such embodiments, a user may wish to reuse an old identity which may not be present or used anymore. A new OPI identity may also be generated. As such, the application may support changing the OPI identity associated with a particular Application identity.

Support may be provided when there may be no Interface between Application and ProSe Server as described herein. For example, one characteristic of embodiments disclosed herein may be that Proximity Services may be enabled through an application. Such an embedment or model may not prevent having generic proximity services accessible by each of the PLMN subscribers (e.g. in relation with a third party Application which do not have an interface with the ProSe Server). For example, a generic proximity detection and D2D audio/video connection service may be deployed by the operator where the MNO may in this embodiment deploy an application (e.g. a non-IMS AS) such as a MNO-ProSe-Application. The MNO-ProSe-Application may be collocated with or may be implemented as part of the ProSe server. Other externally provided applications may have a relationship with the MNO but no interface to the EPC.

From a charging stand point, even if the Application may have no interface with the ProSe server, the Application may or may not have an agreement with the MNO. In one embodiment, the Application may be charged, for example, the UE may pass the Application identity to the ProSe server, and the MNO may perform verifications (e.g. of App identity from third party CA; authorization from Application Server; check authorization from internal PLMN configuration in HSS and/or ProSe server; and the like). In embodiments, the end user may be charged for the service.

Additionally, in embodiments, the basic principle of the mechanism may be that the UE may send a request to the Application, which may reply (e.g. if accepted) with a list of the OPI identities mapped from the Application Layer User identities of the various actors of the request. The application may also add other information such as the filters identifying traffic for D2D communication. The UE may then send to the MNO-ProSe-Application a request such as the requests described herein (e.g. above).

As such, support for the no App-CN interface embodiment may be a special case of the main variant of the second embodiment described herein where the Application may be deployed by the MNO (e.g. possibly as part of the ProSe Server itself). The main difference may be that the Third Party Application (e.g. which has no interface with CN) may be able to map usernames with their OPI identities and may provide these OPI identities to their users on request. In an embodiment, no mapping may be used if the 3rd party Application usernames may be OPI identities. Otherwise, the third party Application may have to support username/OPI identity mapping as described herein.

Support may also be provided in embodiments where UEs may be out of coverage. For example, device-to-device communication may also be enabled when one or more of the UEs may be out of cellular network coverage. In this embodiment, each UE may be aware of the other identity that may be used for discovery as well as D2D capabilities. Moreover, the UEs may have compatible D2D detection configuration (e.g. one UE may be in a listen operation and the other UE may initiate the transmission of beacons).

The method of such an embodiment may enable pre-configuring UEs for such an operation ahead of time, for example, when the UEs may be under network coverage and connected to the Application and to the ProSe server. In an embodiment, one user may initiate the pre-configuration procedure with the Application. The application may transmit the request to the ProSe Server. The ProSe server may communicate the request to the UEs (e.g. after mapping from an OPI identity to a UE identity that may want the UEs to be registered with the ProSe server with the appropriate identities). As opposed to the typical discovery or d2d connection described in this embodiment, the ProSe server may mark these requests as "deferred." Additionally, one or more trigger types may be associated with these requests such as "user initiated" at a certain time or event (e.g. an "out of coverage" event).

In a way similar to the first embodiment, the Application and the ProSe server may establish a temporary service name for the operation and may associate parameters to it such as the ones described herein (e.g. time restriction, QoS requirements, and the like). As such, support for the out-of-coverage case may be used or provided as an extension of the first embodiment.

Figure 10:
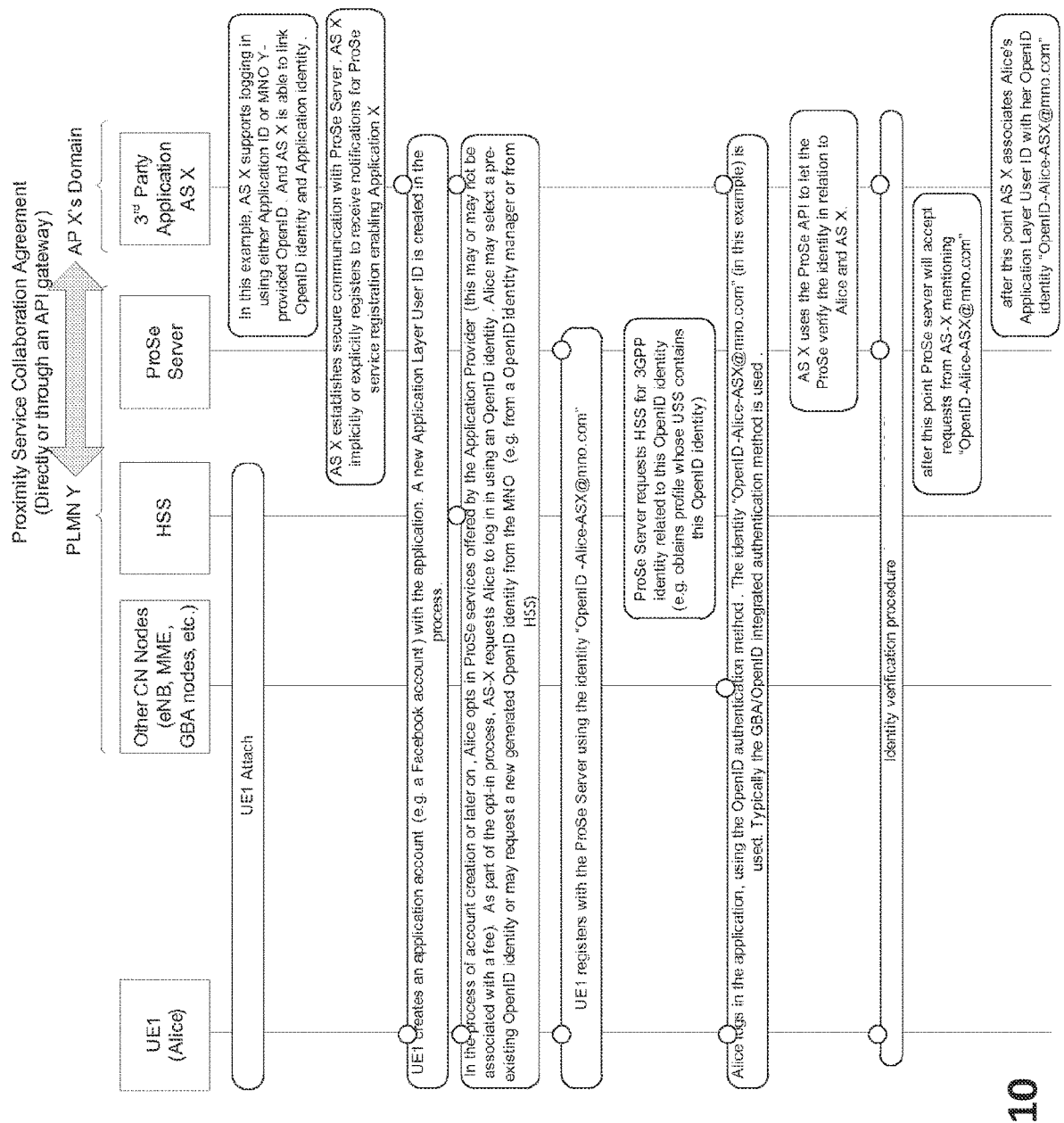
FIG. 10 depicts an example embodiment of an initial activation of a ProSe embodiment.

A procedure or method for an initial activation of the ProSe feature may be shown in FIG. 10. For example, the message flow shown in FIG. 10 may illustrate a procedure or method that may be executed when a user logs into an application and may turn on proximity services within this application. In this example, the application may support both an Application layer login and OpenID login. Embodiments (e.g. cases 1 and 2) as well as other embodiments (e.g. cases) may be also supported.

Figure 11:
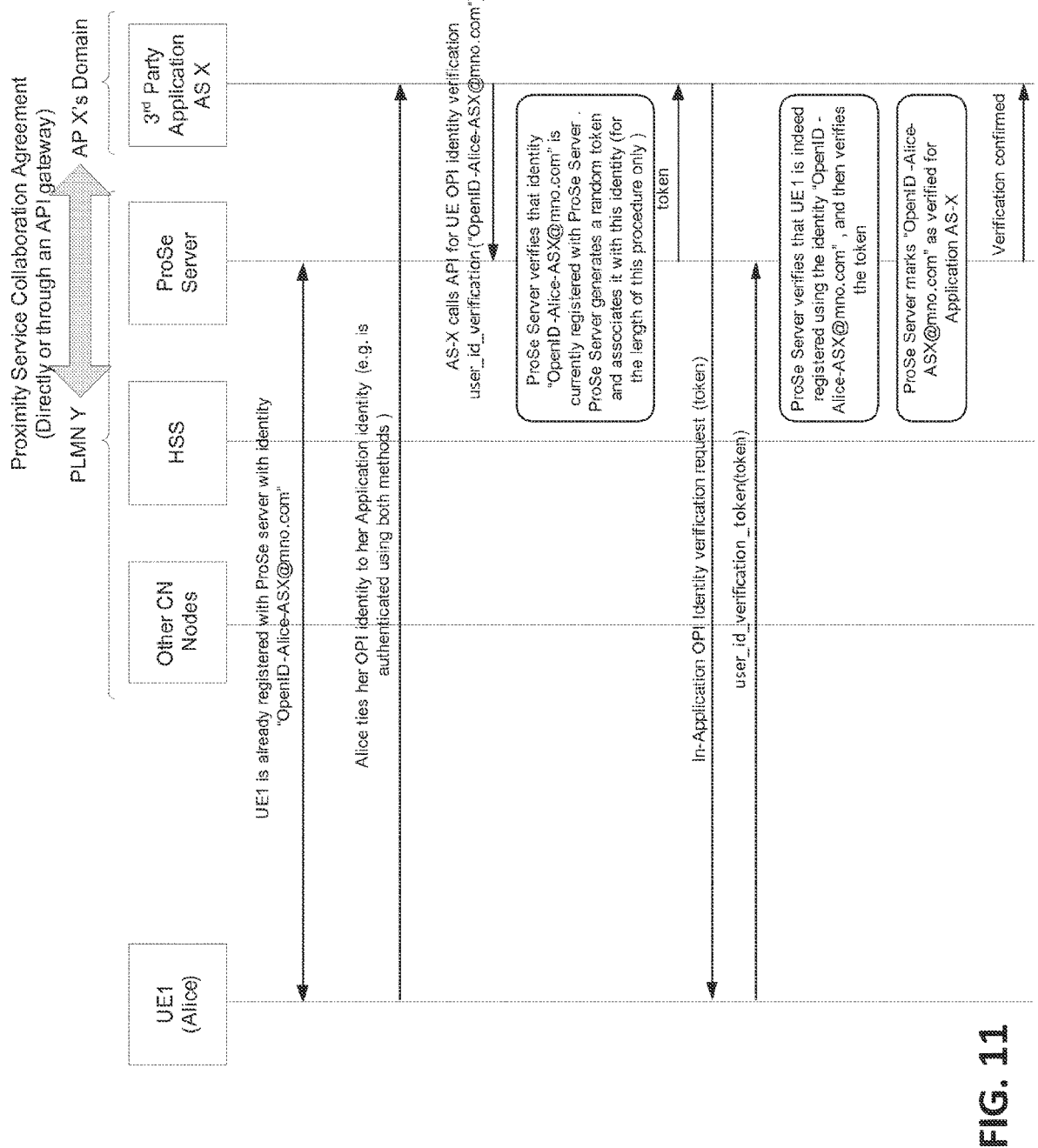
FIG. 11 depicts an example embodiment of an identity verification procedure or method.
Figure 12:
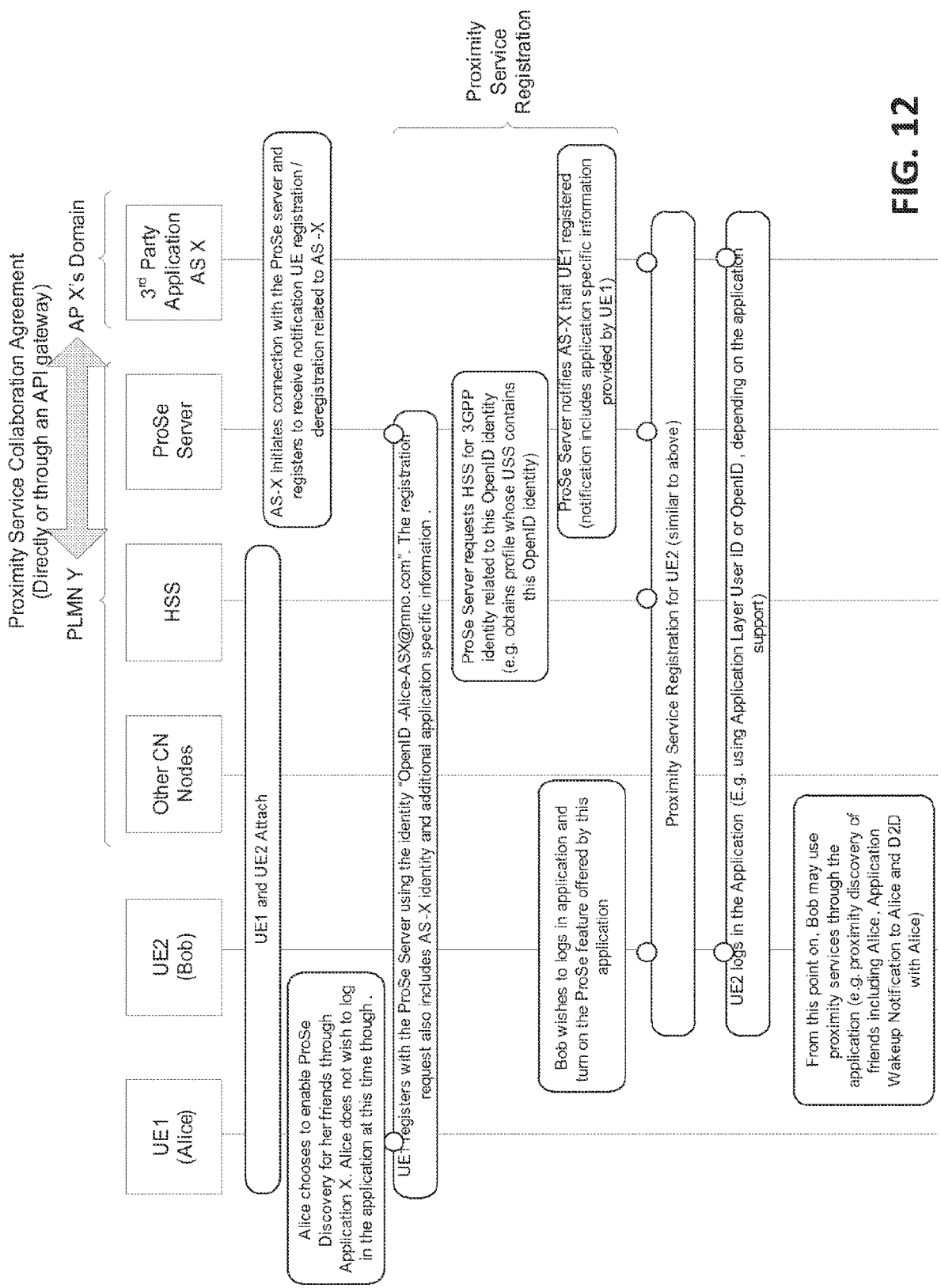
FIG. 12 depicts an example embodiment of a procedure or method for registering with a ProSe (e.g. with or without logging into an application).
Figure 13:
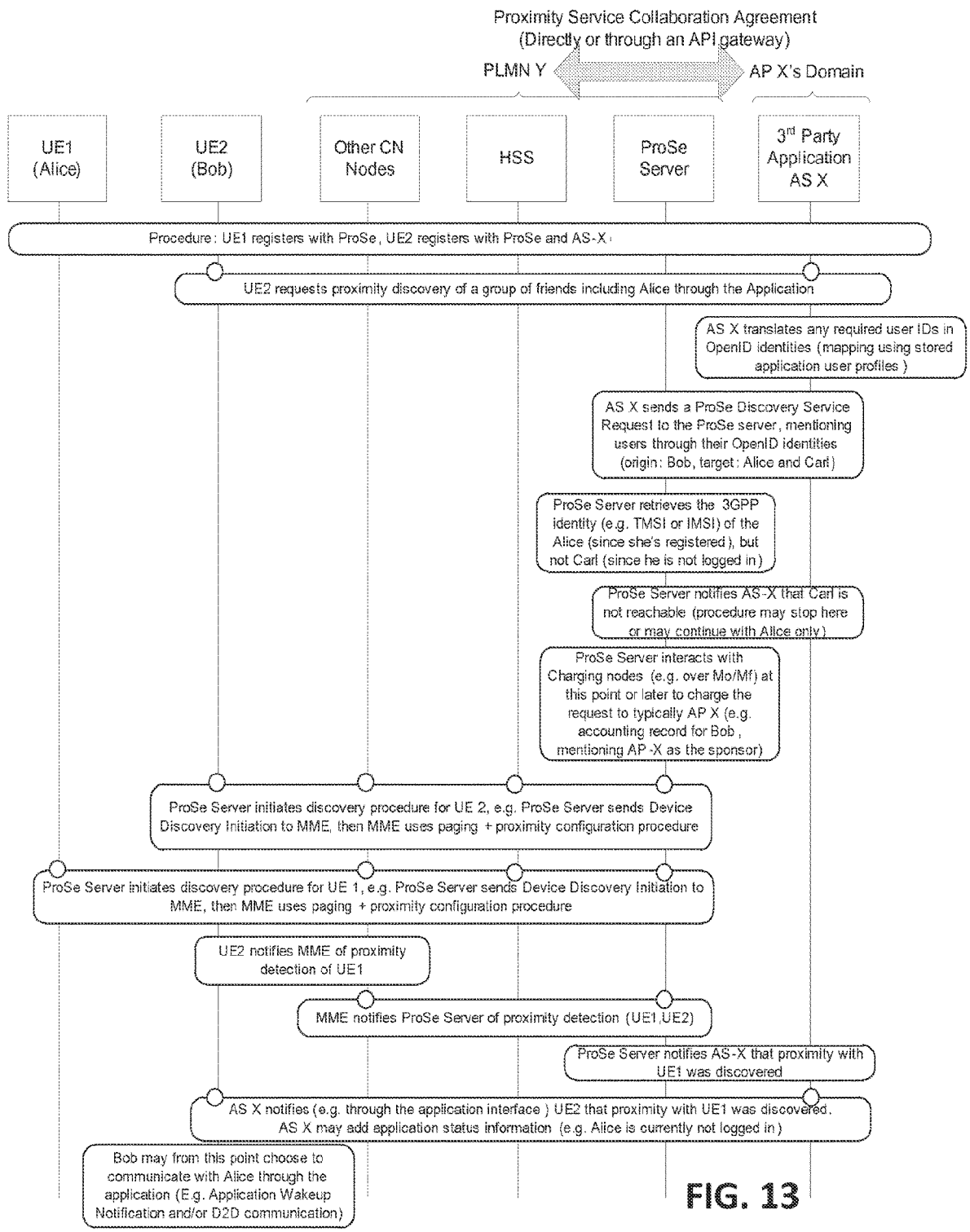
FIG. 13 depicts an example embodiment of a discovery procedure or method.
Figure 14:
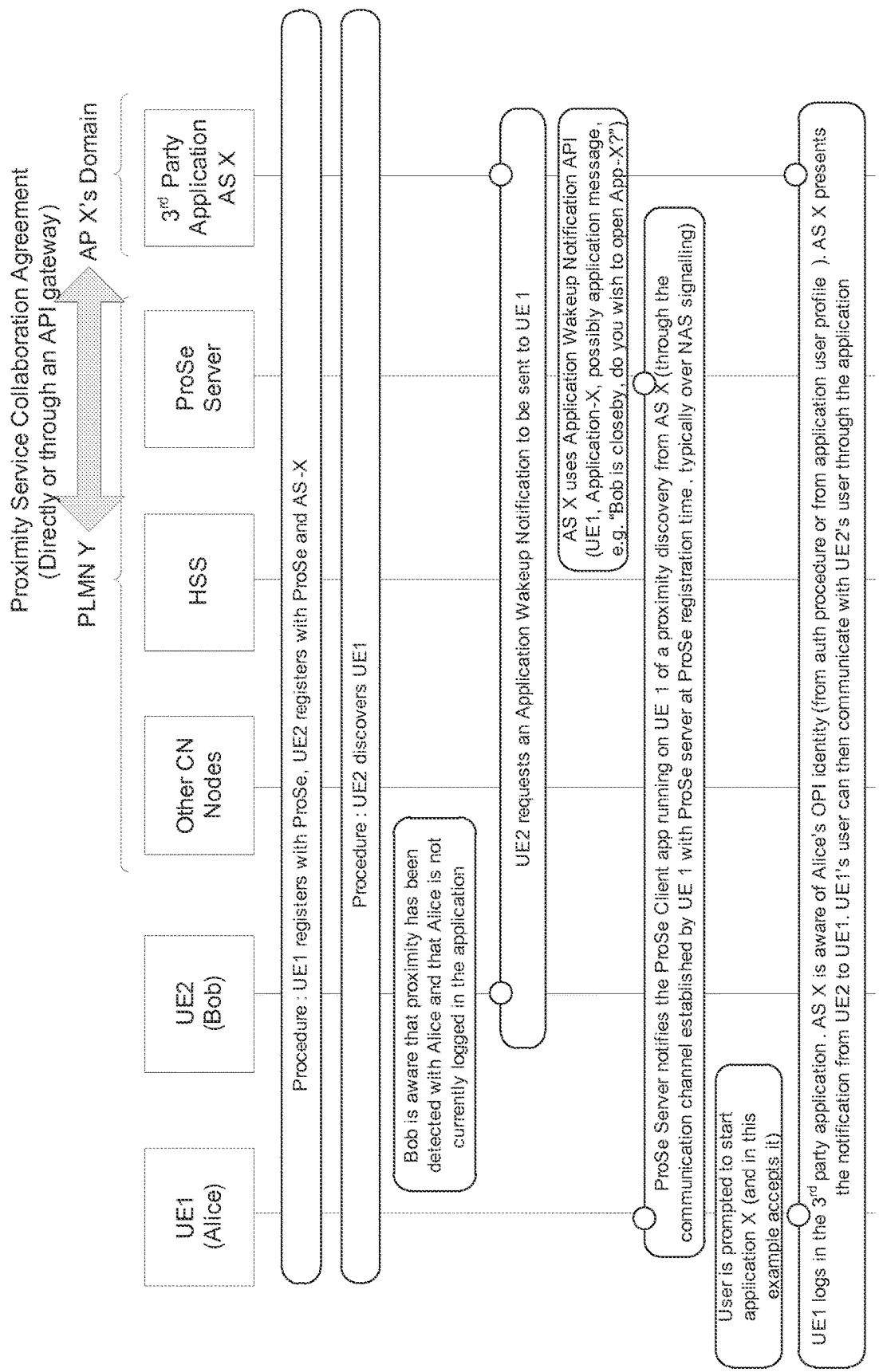
FIG. 14 depicts an example embodiment of an application wakeup notification procedure or method.
Figure 15:
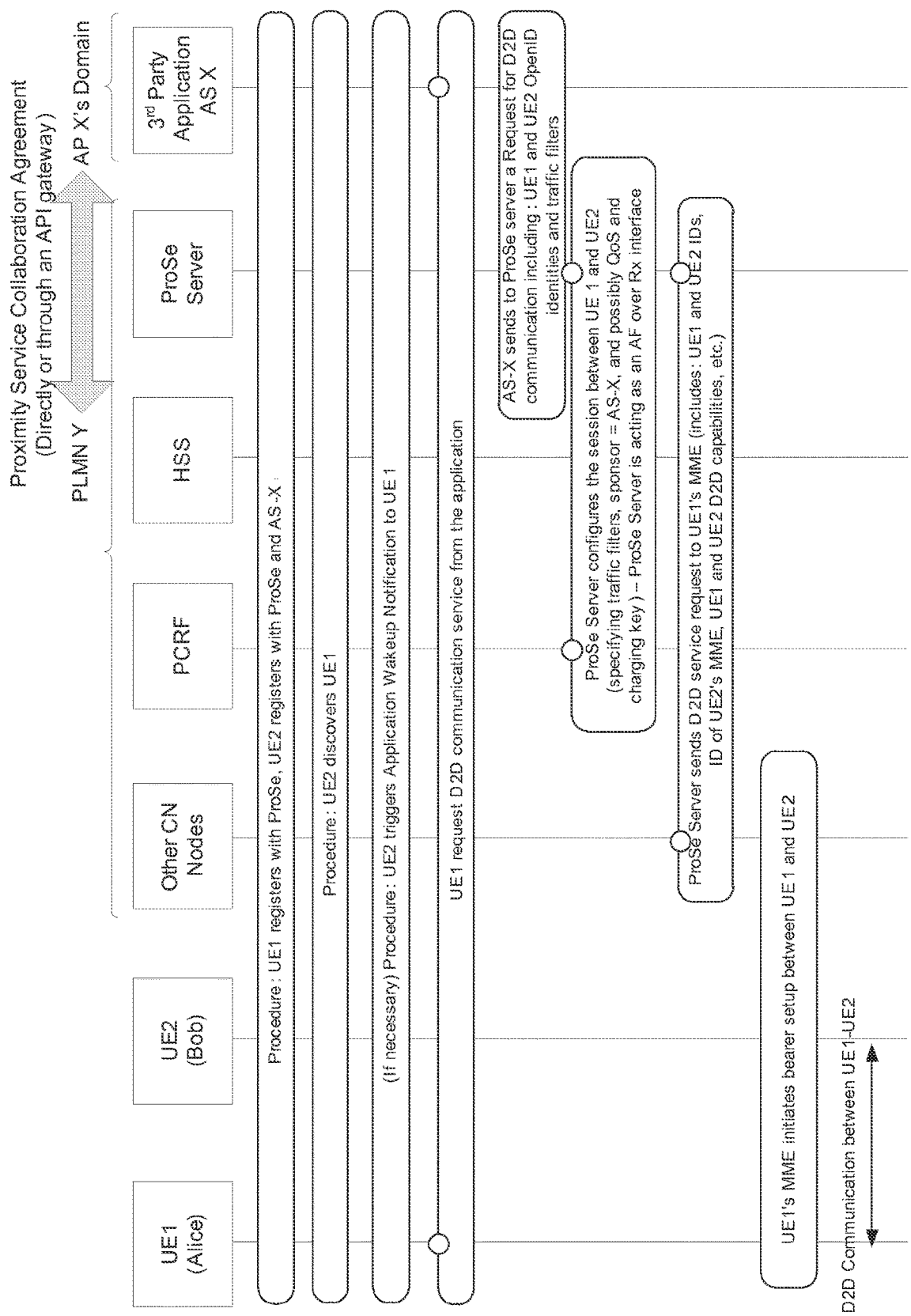
FIG. 15 depicts an example embodiment of a device-to-device (e.g. D2D) connection setup procedure or method.

Additionally, an identity verification procedure or method may be shown in FIG. 11, a procedure or method for registering with a ProSe with or without logging into the Application may be shown in FIG. 12, and/or a discovery procedure or method may be shown in FIG. 13. The method or procedure shown in FIG. 12 may depict a UE based discovery. However, in an embodiment, a network based discovery where the MME may collect proximity updates from the UEs and may detect proximity based on this information may also be provided and/or used. An application wakeup notification method or procedure may be shown in FIG. 14 and a device-to-device connection setup procedure or method may be shown in FIG. 15.

As described herein, one or more extensions may be provided and/or used. For example, multiple ProSe Servers may be deployed by a MNO for load balancing and fallback. In this embodiment, once a UE may register with a ProSe server, this ProSe server may use a DNS system or another mapping system to bind itself to the particular OPI identity that may be used by the UE. If a ProSe service may be requested for UEs handled by different ProSe servers, these servers may cooperate. For example, the ProSe server may be initially contacted by the application (e.g. the "acting ProSe Server") that may use DNS to locate other ProSe Servers handling identities it may not know about, and may then request UE identities such as 3GPP UE identities from these ProSe Server (e.g. using ProSe Server-ProSe Server messages such as get_user_profile(OPI Identity, AP-X). In an example embodiment, these ProSe servers may provide UE identities such as 3GPP UE identities if the requesting Application may have been authorized by the end user when registering with its ProSe Server.

Similarly, ProSe servers deployed by different MNOs may cooperate to exchange 3 GPP UE identities such that the acting ProSe Server may interact with the different Core Network nodes to enable the ProSe service.

Extensions for multiple-ProSe (e.g. within the same PLMN or in different PLMNs) may include one or more the following. For example, in one embodiment (e.g. extension), an interface between 2 ProSe Servers may be enabled. this interface may be internal to one MNO, for example, if an MNO may deploy more than 1 ProSe Servers for load balancing. Additionally, this interface may exist between two MNOs, for example, if these two MNOs may have a ProSe cooperation agreement.

In an example embodiment (e.g. an extension), a ProSe Server-to-ProSe Server message (e.g. a new message) such as GetIdentifier may be provided and/or used. Such a message may include one or more parameters including OPI identity, name of the requesting application, and the like. Additionally, when receiving such a request or message from a peer, a ProSe server may search for the OPI identity among currently registered UEs and may return one or more of the following information: a 3GPP identity related to the OPI identity (e.g. TMSI, MSISDN), ProSe Capabilities, and the like. In such an embodiment, the Application may have a ProSe agreement with both MNO 1 and MNO 2. As such, the application may have been notified that a UE such as a UE2 may be registered in a particular PLMN such as PLMN2. This notification may include an application specific configuration such that the application may take this configuration into account when requesting the operation through MNO1.

According to embodiment (e.g. an extension), DNS or ENUM mapping between a ProSe server and an OPI identity as well as a method therefor may be provided and/or used. For example, when a UE may register an OPI identity with a ProSe Server, the ProSe server may upload the mapping information in the DNS or ENUM system (e.g. for alice@mno1.com, a DNS CNAME entry that may define alice.prose.mno1.com as an alias of the prose server prose-server-1.mno1.com).

Additionally, when a ProSe server may receive a request including at least one OPI identity not currently logged into this ProSe server (e.g. bob@mno1.com or bob@mno2.com), the server may perform one or more of the following (e.g. procedures or methods or actions). For example, if the identity provider may the same MNO as the one deploying the ProSe server and/or if several ProSe Servers may be deployed by this MNO, the DNS system may be queried for bob.prose.mno1.com. If there may be an answer, Bob's 3GPP identity from the ProSe server may be requested at the returned IP address (using GetIdentifier( )). If there may be no answer, this OPI identity may not be registered and depending on local policy, the ProSe server may reject the original request or continue partial processing if possible. Additionally, if there may be a single ProSe server deployed by the MNO, this OPI identity may not be registered (e.g. as described above and may be rejected or partial processing may be continued). In an embodiment, if the identity provider may be another MNO 2 with a ProSe cooperation agreement with MNO 1, the DNS system may be queried for bob.prose.mno2.com and the response may be processed as described above.

According to an embodiment, once the acting ProSe server may have the 3GPP identity and capabilities of the related UEs, it may go on and initiate operations such as device discovery or other procedures or methods.

Although the terms UE or WTRU, user, or UE/user may be used herein, it may be understood that the use of such terms may be used interchangeably and, as such, may not be distinguishable.

Additionally, ProSe as used herein may refer to Proximity Services denoting discovery of and/or information exchange between UEs in geographical and/or physical proximity. The same name may be used by 3GPP to describe similar but not necessarily identical functionality. Also, although the terms D2D and ProSe may be used herein, it may be understood that the use of such terms may be used interchangeably and, as such, may not be distinguishable. For example, a D2D server may represent ProSe server or vice-versa and/or implement of a subset of functionalities of the other. Furthermore, although the terms temporary service name and temporary identifier ProSe may be used herein, it may be understood that the use of such terms may be used interchangeably and, as such, may not be distinguishable.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit and receive unit (WTRU) comprising:
   a computing processor configured to at least:
      receive, via a mobile wireless network, a temporary service name associated with a service, the temporary service name comprising a plurality of identifiers, each of the plurality of identifiers corresponding to a respective characteristic associated with the service and associated with a respective level in the temporary service name;

determine that the temporary service name satisfies a filter condition, wherein the filter condition is configured to identify relevant services, and wherein the computing processor being configured to determine that the temporary service name satisfies the filter condition comprises the computing processor being further configured to determine that a subset of the plurality of identifiers satisfies the filter condition; and based on the determination that the temporary service name satisfies the filter condition, communicate a notification to an application server.

2. The WTRU of claim 1, wherein the computing processor being configured to determine that the temporary service name satisfies the filter condition comprises the computing processor being further configured to determine that a portion of the temporary service name satisfies the filter condition.

3. The WTRU of claim 1,
wherein each of the plurality of identifiers corresponds to a level in a hierarchy of levels comprising at least a first level, a second level, and a third level; and
wherein the computing processor being configured to determine that the temporary service name satisfies the filter condition comprises the computing processor being further configured to determine that one of the plurality of identifiers corresponding to the first level satisfies the filter condition.

4. The WTRU of claim 1,
wherein each of the plurality of identifiers corresponds to a level in a hierarchy of levels comprising at least a first level, a second level, and a third level; and
wherein the computing processor being configured to determine that the temporary service name satisfies the filter condition comprises the computing processor being further configured to determine that a first of the plurality of identifiers corresponding to the first level and a second of the plurality of identifiers corresponding to the second level satisfy the filter condition.

5. The WTRU of claim 1,
wherein each of the plurality of identifiers corresponds to a level in a hierarchy of levels comprising at least a first level, a second level, and a third level; and
wherein the computing processor being configured to determine that the temporary service name satisfies the filter condition comprises the computing processor being further configured to determine that a first of the plurality of identifiers corresponding to the first level, a second of the plurality of identifiers corresponding to the second level, and a third of the plurality of identifiers corresponding to the third level satisfy the filter condition.

6. The WTRU of claim 1, wherein the computing processor being configured to communicate the notification to the application server comprises the computing processor being further configured to communicate a request to join the service associated with the temporary service name.

7. The WTRU of claim 1, wherein the computing processor configured to receive the temporary service name associated with the service is configured to receive the temporary service name from a second WTRU.

8. The WTRU of claim 1, wherein the computing processor is further configured to receive a policy, and
wherein the computing processor being configured to determine that the received temporary service name satisfies the filter condition comprises the computing processor being further configured to determine that the received temporary service name satisfies the policy.

9. The WTRU of claim 8, wherein the computing processor is further configured to:
communicate a request for the policy.

10. A method for service discovery comprising:
a first wireless transmit and receive unit (WTRU) receiving a temporary service name associated with a service, the temporary service name comprising a plurality of identifiers, each of the plurality of identifiers corresponding to a respective characteristic associated with the service and associated with a respective level in the temporary service name;
the first WTRU determining the received temporary service name satisfies a filter condition, the filter condition configured to identify relevant services, wherein determining that the received temporary service name satisfies the filter condition comprises determining that a subset of the plurality of identifiers satisfies the filter condition; and
the first WTRU, upon based on determining the received temporary service name satisfies the filter condition, communicating a notification to an application server.

11. The method of claim 10, wherein determining the received temporary service name satisfies the filter condition further comprises determining a portion of the received temporary service name satisfies the filter condition.

12. The method of claim 10,
wherein each of the plurality of identifiers corresponds to a level in a hierarchy of levels comprising at least a first level, a second level, and a third level; and
wherein determining the received temporary service name satisfies the filter condition further comprises determining one of the plurality of identifiers corresponding to the first level satisfies the filter condition.

13. The method of claim 10,
wherein each of the plurality of identifiers corresponds to a level in a hierarchy of levels comprising at least a first level, a second level, and a third level; and
wherein determining the received temporary service name satisfies the filter condition further comprises determining a first of the plurality of identifiers corresponding to the first level and a second of the plurality of identifiers corresponding to the second level satisfy the filter condition.

14. The method of claim 10,
wherein each of the plurality of identifiers corresponds to a level in a hierarchy of levels comprising at least a first level, a second level, and a third level; and
wherein determining the received temporary service name satisfies the filter condition further comprises determining a first of the plurality of identifiers corresponding to the first level, a second of the plurality of identifiers corresponding to the second level, and a third of the plurality of identifiers corresponding to the third level satisfy the filter condition.

15. The method of claim 10, wherein communicating the notification to the application server comprises communicating a request to join the service associated with the temporary service name.

16. The method of claim 10, wherein receiving the temporary service name associated with the service comprises receiving the temporary service name from a second WTRU.

17. The method of claim 10, further comprising:
receiving a policy,
wherein determining the received temporary service name satisfies the filter condition comprises determining the received temporary service name satisfies the policy.
18. The method of claim 17 further comprising:
communicating a request for the policy.

* * * * *